(12) United States Patent
Brazier et al.

(10) Patent No.: US 8,938,221 B2
(45) Date of Patent: Jan. 20, 2015

(54) SYSTEM AND METHOD FOR PROVIDING A CALLBACK CLOUD

(71) Applicant: Virtual Hold Technology, LLC, Akron, OH (US)

(72) Inventors: Robert Brazier, Akron, OH (US); Eric Camulli, Copley, OH (US)

(73) Assignee: Virtual Hold Technology, LLC, Akron, OH (US)

( * ) Notice: Subject to any disclaimer, the term of this patent is extended or adjusted under 35 U.S.C. 154(b) by 262 days.

(21) Appl. No.: 13/659,902

(22) Filed: Oct. 24, 2012

(65) Prior Publication Data

US 2013/0054684 A1 Feb. 28, 2013

Related U.S. Application Data

(63) Continuation-in-part of application No. 13/446,758, filed on Apr. 13, 2012, now Pat. No. 8,792,866, which is a continuation-in-part of application No. 12/320,517, filed on Jan. 28, 2009, now Pat. No. 8,213,911, application No. 13/659,902, which is a continuation-in-part of application No. 13/479,870, filed on May 24, 2012.

(51) Int. Cl.
*H04M 3/42* (2006.01)
*G06F 15/16* (2006.01)
*G06F 17/30* (2006.01)
*G06Q 10/02* (2012.01)
*H04M 3/523* (2006.01)

(52) U.S. Cl.
CPC ............ *G06F 17/3087* (2013.01); *G06Q 10/02* (2013.01); *H04M 3/5231* (2013.01); *H04M 3/5238* (2013.01)

USPC ......................................... 455/414.1; 709/203

(58) Field of Classification Search
CPC ..................................................... H04L 12/1818
USPC ......................................... 709/203; 455/414.1
See application file for complete search history.

(56) References Cited

U.S. PATENT DOCUMENTS

| | | | |
|---|---|---|---|
| 7,113,456 B2 * | 9/2006 | Kusano et al. | 369/30.09 |
| 8,090,764 B2 * | 1/2012 | Sato et al. | 709/203 |
| 8,213,911 B2 * | 7/2012 | Williams et al. | 455/414.1 |
| 8,792,866 B2 * | 7/2014 | Williams et al. | 455/414.1 |
| 2002/0138278 A1 * | 9/2002 | Reinold et al. | 704/500 |

(Continued)

*Primary Examiner* — Jerry Dennison
(74) *Attorney, Agent, or Firm* — Brian R. Galvin; Galvin Patent Law LLC

(57) ABSTRACT

A system for providing a callback cloud, comprising an application server operated by a callback cloud service provider, a media server, a session management server, an interaction manager, and an intent analysis engine. The application server receives registrations from callback providers unaffiliated with the callback service provider. The application server is adapted to receive callback requests from users, comprising a specific callback provider from whom a callback is requested, when a requested callback should be made, and allowable media types. The application server directs the callback request to the interaction manager, and the interaction manager sends data elements pertaining to the request to the intent analysis engine and receives therefrom data elements pertaining to the callback request determined based on an analysis of the requester's intent. The interaction manager directs the session management server to initiate a callback, and the session management server provides signaling to the media server to conduct the callback.

2 Claims, 22 Drawing Sheets

(56) References Cited

U.S. PATENT DOCUMENTS

| | | | |
|---|---|---|---|
| 2003/0041123 A1* | 2/2003 | Sato et al. | 709/219 |
| 2003/0235287 A1* | 12/2003 | Margolis | 379/265.01 |
| 2005/0278729 A1* | 12/2005 | Lamkin et al. | 719/328 |
| 2007/0086585 A1* | 4/2007 | Dorricott et al. | 379/265.01 |
| 2007/0160076 A1* | 7/2007 | Faber et al. | 370/461 |
| 2007/0185977 A1* | 8/2007 | Sato et al. | 709/219 |
| 2013/0054684 A1* | 2/2013 | Brazier et al. | 709/203 |

* cited by examiner

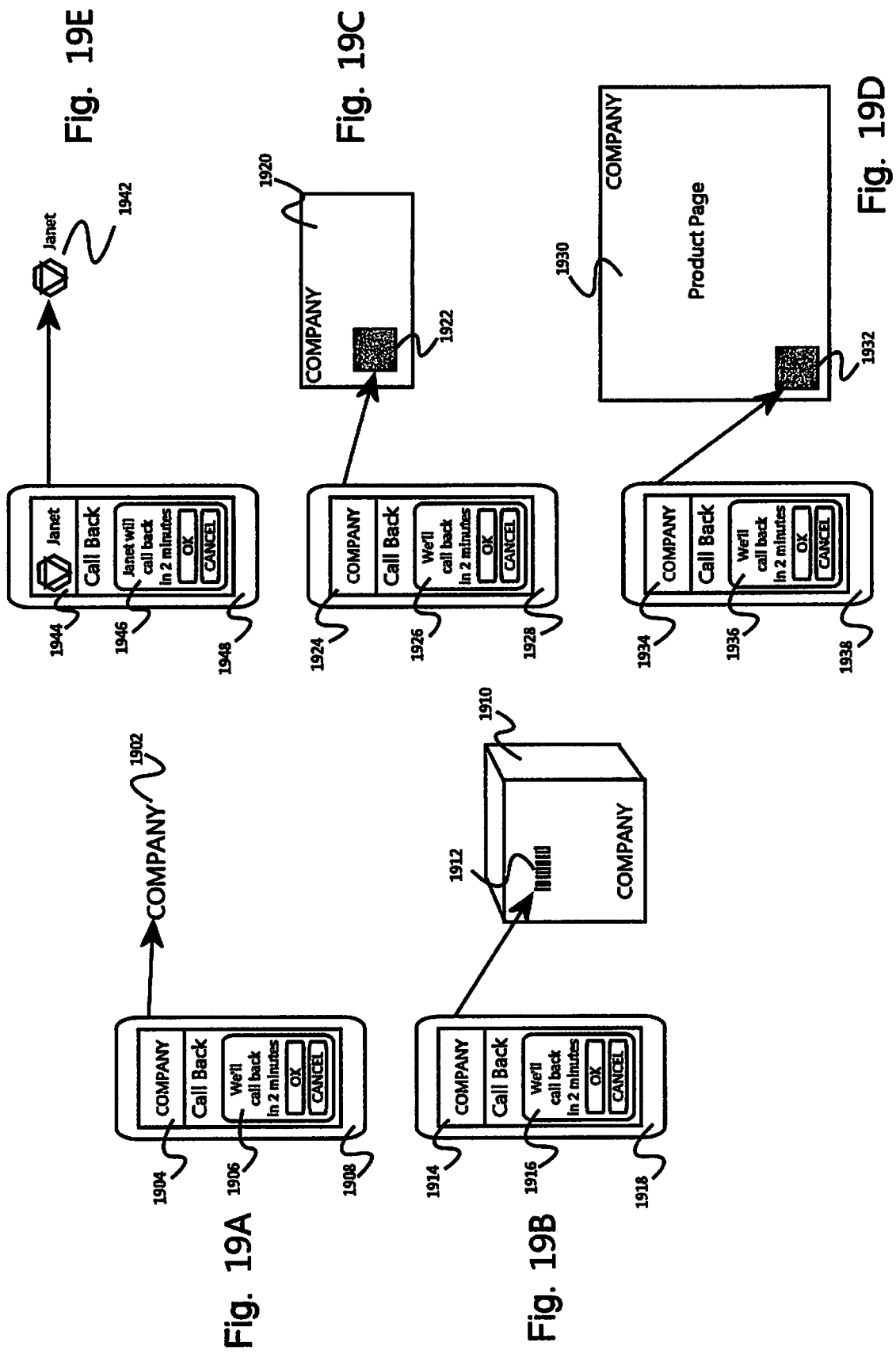

SYSTEM AND METHOD FOR PROVIDING A CALLBACK CLOUD

CROSS-REFERENCE TO RELATED APPLICATIONS

This application is a continuation-in-part of U.S. patent application Ser. No. 13/446,758, which was filed on Apr. 13, 2012 and titled "A MOBILE COMMUNICATION DEVICE FOR ESTABLISHING AUTOMATED CALL BACK," which is a continuation-in-part of U.S. patent application Ser. No. 12/320,517, now issued as U.S. Pat. No. 8,213,911, which was filed on Jan. 28, 2009 and titled "A MOBILE COMMUNICATION DEVICE FOR ESTABLISHING AUTOMATED CALL BACK," the specifications of both of which are hereby incorporated by reference in their entirety. This application is also a continuation-in-part of U.S. patent application Ser. No. 13/479,870, which was filed on May 24, 2012 and titled "MANAGING, DIRECTING, AND QUEUING COMMUNICATION EVENTS USING IMAGE TECHNOLOGY", which is also a continuation-in-part of U.S. patent application Ser. No. 12/320,517, now issued as U.S. Pat. No. 8,213,911, the specifications of both of which are hereby incorporated by reference in their entirety.

BACKGROUND OF THE INVENTION

1. Field of the Invention

The systems and methods described herein relate to managing the queuing of clients waiting to be connected by telephone to a service agent of a business communication center. More particularly, the systems and methods described herein relate to providing a callback cloud service that enables client interactions to be added to a cloud-based virtual queue utilizing web service messaging and relate to establishing a communications interaction or connection between clients and service agents on an automated basis and in an order maintained by a queue.

2. Discussion of the State of the Art

Many businesses use groups of service representatives for communicating with clients who initiate communications with the business, such as by telephone calls. To most efficiently use the time and skills of each service representative, the service representatives may be organized into groups based on a skill set. For example, the groupings may be based on the representative's ability to handle client issues such as the opening of new accounts, billing issues and customer service issues on existing accounts.

Typically, if a client calls such a business, voice prompt menu choices enable the calling client to identify the issue for which the client requires service and the client is then queued for a service agent capable of handling the identified issue. As such, it is expected that clients who identify the purpose of their call as a "billing issue" will be queued for, and connected to, a service representative with the ability to handle billing issues. Similarly, it is expected that clients who identify the purpose of their call as a "customer service issue" will be queued for, and connected to, a service representative with the ability to handle customer service issues.

There are problems with existing communications systems, such as contact centers, including the following two problems. First, the voice prompt menus that are used to channel callers to the queue for the appropriate group of service agents are exacerbating to a client at best. It takes significant time to navigate the layered menus of voice prompts.

Second, waiting on-hold while the telephone connection is maintained in queue for connection to a service agent is also exacerbating to a client at best.

In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al., which is commonly assigned with the present application.

While such a system may make the experience of waiting for a connection to a service representative slightly less exasperating, it does not address the inconvenience of having to navigate an irritatingly slow and usually complicated voice prompt menu to enter the queue.

What is needed is a system and various methods for providing a callback cloud and related services that overcome the limitations of the prior art noted above.

SUMMARY OF THE INVENTION

Accordingly, the inventor has conceived, and reduced to practice, various systems and methods for providing a callback cloud.

In a preferred embodiment of the invention, a system for providing a callback cloud is disclosed. According to the embodiment, the system comprises a callback cloud, which may accept requests from a plurality of communications networks, such as a Public Switched Telephone Network (PSTN) or the Internet. Such requests may include a request for callback, request for estimated callback time, or a status or presence request from a customer service group or individual. In addition, the Internet connected device sends a callback number in the form of data to the callback cloud, which it will utilize to create a voice connection between the requester and the party to be reached. In addition to the phone number of the originating party, the callback cloud also accepts data requests in the form of a logo, avatar, photograph, QR code, or other symbol. Communication networks may be connected to a plurality of consumer users communicating via a variety of devices such as a traditional or cellular telephone, laptop or desktop computer, or mobile tablet. Such devices may be communicating via a variety of means, such as a traditional telephone dialer for placing calls, a Voice over IP (VOIP) client application for placing calls over an Internet connection, or one of a host of web browsing applications. A communications network may be further connected to a variety of enterprise users communicating through a network switch or directly through a cellular telephone, and additional devices may be connected via internal Local Area Networks (LANs) or Wide Area Networks (WANs), such as mobile tablets or personal computers, again each of which may use a variety of communication means such as dialers, VOIP, or web browsers. Such devices may then be connected via a computer acting as a network bridge, which connects two different communications networks so that devices may share them—such as allowing a mobile tablet PC to communicate via a PSTN using common telephone technology rather than using the Internet for VOIP or web browsing. It will be appreciated by one having ordinary skill in the art that such network configurations are exemplary, and a host of additional devices, technologies, and arrangements are possible and becoming possible as the art progresses.

In another preferred embodiment of the invention, an infrastructure for a callback cloud is disclosed. According to the embodiment, a callback cloud may receive incoming data from a communications network such as a PSTN via a telephony switch or media server, or from the Internet via a media or web server. Data from such servers may then be processed by a plurality of second-layer integration services, such as a Computer Telephony Integration (CTI) server or Session Initiation Protocol (SIP) server, which may translate data to make it usable and available to other internal services such as a rules engine, which may apply conditions or routing rules for callback requests, and a data store which may collect requester data. It will be appreciated that such services are exemplary, and additional elements may be incorporated according to the invention.

In another preferred embodiment of the invention, a method for providing a callback cloud comprising the steps of registration, acceptance, matching, acknowledgement, and connection is disclosed. According to the embodiment, in an initial registration step a user or organization desiring to be available for requests for callbacks from the user's friends, the organization's customers, or the like (collectively, these may be considered to be "callback participants"), may register with a callback cloud so that they can be reached through it. Similarly, persons anticipating future needs to be called back using a callback service may be allowed to register with the service, providing a plurality of contact means (phone numbers and the like) that may be maintained (generally in confidence) by the provider of the callback cloud (these registrants may be referred to herein also as "callback requesters"). In some cases, certain individuals or organizations may act at various times as both callback participants and callback requesters, and registration should be understood to encompass both scenarios. This prevents the need for individuals to publish their phone numbers in directory listings, and maintains a level of anonymity and privacy that may be desirable to many users. Parties may be groups, companies, or individuals and they may register their name, phone numbers, logos, avatars, photographs, QR codes or other unique symbol or identifier (which may be completely arbitrary and chosen by the requester)—this is in contrast to traditional telephone directories, where the forms of identification are often limited to a phone number, name, and address information or other language-based identifiers which can be easily entered on a traditional telephone keypad or dialer and which may require a user to make personally-identifiable information available to unknown parties rather than arbitrarily-chosen unique symbolic identifiers. After registration, a callback cloud accepts requests for callback from individuals, each request specifying a person or organization from whom a callback is desired. The callback cloud then attempts to match the data received with the request against a database of registration data to determine if the party from whom a callback is requested has previously registered with the callback cloud. Once a match is found in a matching step, a callback cloud may obtain additional data from the request or from the party from whom a callback was requested, and may thereupon send the obtained data back to the requester in an acknowledgement step indicating an estimated callback time or a status, and may include additional information such as application-specific details depending on how the initial request was received, or user-specific data based on additional requests by the requester. In a final connection step, callback cloud connects the two parties without either party knowing the phone number of the other, based entirely on the unique identifier(s) provided by each user upon registration. Such a method allows users to disclose only that information which they feel comfortable making available to unknown parties, and it will be appreciated that such a level of privacy may be highly desirable and at the same time difficult to achieve with existing systems and methods.

In a very real sense, the invention disclosed herein shifts away from "routing interactions" to "routing intentions". That is, when a consumer decides to call a toll-free number to reach an enterprise, on one level she is dialing or entering an address that corresponds to a particular endpoint device such as a phone. But on a more meaningful level, her intent is quite different; she wants to contact someone who can help her with some problem or question pertaining to the company she is calling. Similarly, when a person dials a number of a colleague's work phone, then checks presence status of that colleague on an instant messaging system, then dials that colleague's mobile phone, he is carrying out three distinct interaction initiations targeting three different endpoints (and two different types of interactions), but his intent is the same throughout: he urgently wishes to converse with the colleague. Conventional routing systems are designed to route an interaction (such as a phone call or an instant message) to an available resource. The instant invention, on the other hand, in a very real sense enables businesses or individuals (or indeed other entities) to specify rules for routing intentions, or to provide an intent routing system. Taking the previous example, the person trying to reach his colleague could state his intent: "I need to reach the head of sales in Wisconsin", and a system according to the invention could analyze that intention. For example, the system could determine who is the head of sales in Wisconsin (the person stating his intent might not actually know); it could consult default rules and person-specific rules applying to or set up by the head of sales in Wisconsin; it could decide based on circumstances which is the best channel (office phone, home phone, mobile phone, instant messaging, a conference room phone, etc.) to use to connect the person seeking and the person being sought; it could make prioritization decisions, and might for example come back to the requester and state, "Bob Jones is in a meeting, but could speak with you at 3:30 this afternoon; please advise if this time is acceptable". Thus intent analysis is an important part of the overall scheme of the invention: what is intended, with what priority, with what time and channel constraints (if any), and who may satisfy the intended need (a specific person, an application, anyone with a specific skill, and so forth, can all be determined by automated analysis of the intentions of a person initiating contact. In the context of a callback cloud, "intent" generally relates either to a callback provider's registering with the callback cloud and specifying rules of availability, priority, and the like; or to a callback requester's intentions as explicitly or implicitly provided at the moment when a callback is requested. Importantly, in many cases the callback cloud will be able to mediate intentions of callbacks providers and requesters and initiate callbacks accordingly, without requiring either party to obtain or use sensitive information such as phone numbers, account numbers, and the like. In some situations, a plurality of intents may be combined and handled via a single callback. In some embodiments, one or more entities may act as "intent brokers" and may thereby facilitate connection of two or more parties or resources (which may comprise entities such as persons, communications devices, applications, and the like) to satisfy a plurality of intents pertaining to one or more of the parties or resources.

According to a preferred embodiment of the invention, a system for providing a callback cloud, comprising an application server software module operating on a network-attached computer and operated by a callback cloud service provider; a media server accessible via a network by the application server; a session management server operating on a network-attached computer and coupled to the media server; an interaction manager software module operating on a network-attached server; an intent analysis engine software module operating on a network-attached server; and a callback cloud database operating on a network-attached computer is disclosed. According to the embodiment, the application server is adapted to receive registrations from participating callback providers unaffiliated with the callback service provider, the registrations providing at least a plurality of channels and endpoints from which callbacks may be placed and a plurality of rules regarding when callbacks may be made; the application server is adapted to receive a callback request from a first user, the callback request comprising at least an indicia of a specific callback provider from whom a callback is requested, an indicia of when a requested callback should be made, and an indicia of allowable media types for a requested callback; upon receiving a callback request, the application server directs the callback request to the interaction manager, and the interaction manager sends at least a first plurality of data elements pertaining to the callback request to the intent analysis engine and receives from the intent analysis engine a second plurality of data elements pertaining to the callback request, the second plurality of data elements being determined based at least on an analysis of the intent of the callback request; and the interaction manager directs the session management server to initiate a first callback at a specific time and using a specific channel and resource based at least on the second plurality of data elements, and the session management server provides signaling to the media server to conduct the first callback using the specific channel and resource specified by the interaction manager.

According to another preferred embodiment of the invention, a method for providing a callback cloud, the method comprising the steps of: (a) receiving, at an application server software module operating on a network-attached computer and operated by a callback cloud service provider, a registration from a participating callback provider unaffiliated with the callback service provider, the registration providing at least a plurality of channels and endpoints from which callbacks may be placed and a plurality of rules regarding when callbacks may be made; (b) receiving, at the application server software module, a callback request from a first user, the callback request comprising at least an indicia of a specific callback provider from whom a callback is requested, an indicia of when a requested callback should be made, and an indicia of allowable media types for a requested callback; (c) directing the callback request to an interaction manager software module operating on a network-attached server; (d) sending, using the interaction manager, at least a first plurality of data elements pertaining to the callback request to an intent analysis engine software module operating on a network-attached server; (e) receiving, from the intent analysis engine, a second plurality of data elements pertaining to the callback request, the second plurality of data elements being determined based at least on an analysis of the intent of the callback request; (f) directing a session management server operating on a network-attached computer and coupled to the media server to initiate a first callback at a specific time and using a specific channel and resource based at least on the second plurality of data elements; (g) providing signaling, using the session management server, to a media server accessible via a network, to conduct the first callback using the specific channel and resource specified by the interaction manager; and (h) conducting the first callback as specified.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 19A illustrates the use of image-capture on a mobile device with a callback cloud, according to an embodiment of the invention.

FIG. 19B illustrates the use of image-capture on a mobile device with a callback cloud, according to an embodiment of the invention.

FIG. 19C illustrates the use of image-capture on a mobile device with a callback cloud, according to an embodiment of the invention.

FIG. 19D illustrates the use of image-capture on a mobile device with a callback cloud, according to an embodiment of the invention.

FIG. 19E illustrates the use of image-capture on a mobile device with a callback cloud, according to an embodiment of the invention.

DETAILED DESCRIPTION

Figure 1:
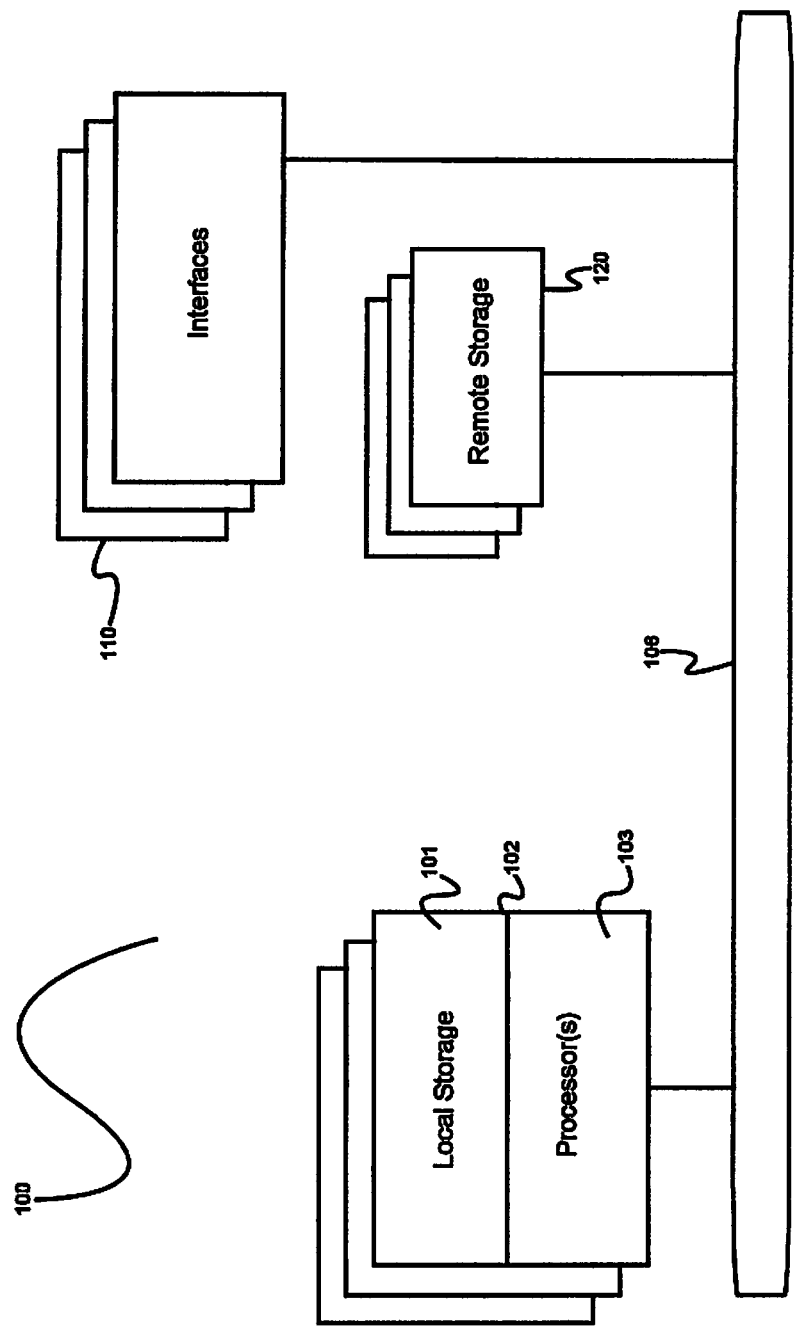
FIG. 1 is a block diagram illustrating a hardware architecture of a computing device used in various embodiments of the invention.

The inventor has conceived, and reduced to practice, various systems and methods for providing a callback cloud. Various techniques will now be described in detail with reference to a few example embodiments thereof, as illustrated in the accompanying drawings. In the following description, numerous specific details are set forth in order to provide a thorough understanding of one or more aspects and/or features described or referenced herein. However, it will be apparent to one skilled in the art, that one or more aspects and/or features described or referenced herein may be practiced without some or all of these specific details. In other instances, well known process steps and/or structures have not been described in detail in order to not obscure some of the aspects and/or features described or reference herein.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code which is encoded within computer readable media accessible to the processor, or a combination of a hardware circuit(s) and a processor or control block of an integrated circuit executing machine readable code encoded within a computer readable media. As such, the term circuit, module, server, or other equivalent description of an element as used throughout this specification is intended to encompass a hardware circuit (whether discrete elements or an integrated circuit block), a processor or control block executing code encoded in a computer readable media, or a combination of a hardware circuit(s) and a processor and/or control block executing such code.

It should also be appreciated that the table structures represented in this application are exemplary only and intended to show the mapping of relationships between various data elements. Other table structures may store similar data elements in various manners. Further, the applicant's use of the term "plurality" is intended to indicate not just "at least one", but one, two, three, or any other quantity. The applicant's use of the term "group" is intended to indicate not just "at least one", but two, three, or more of the items within the group.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
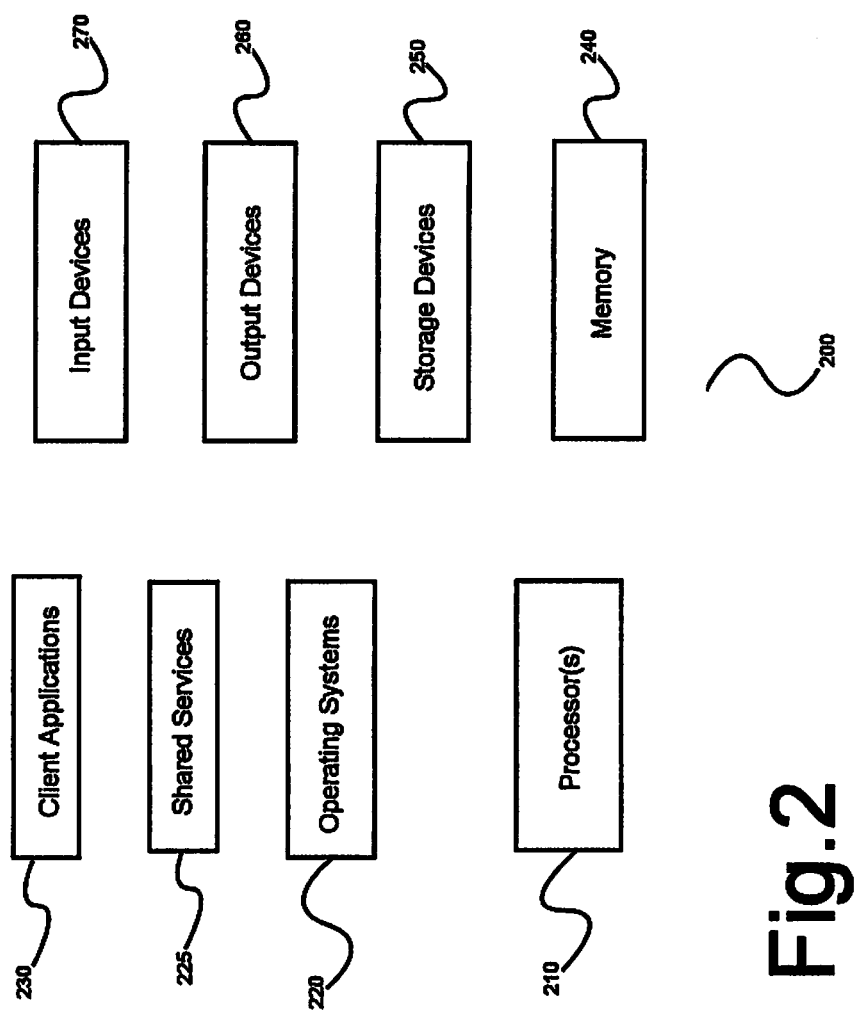
FIG. 2 is a block diagram illustrating an exemplary logical architecture for a client device, according to various embodiments of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
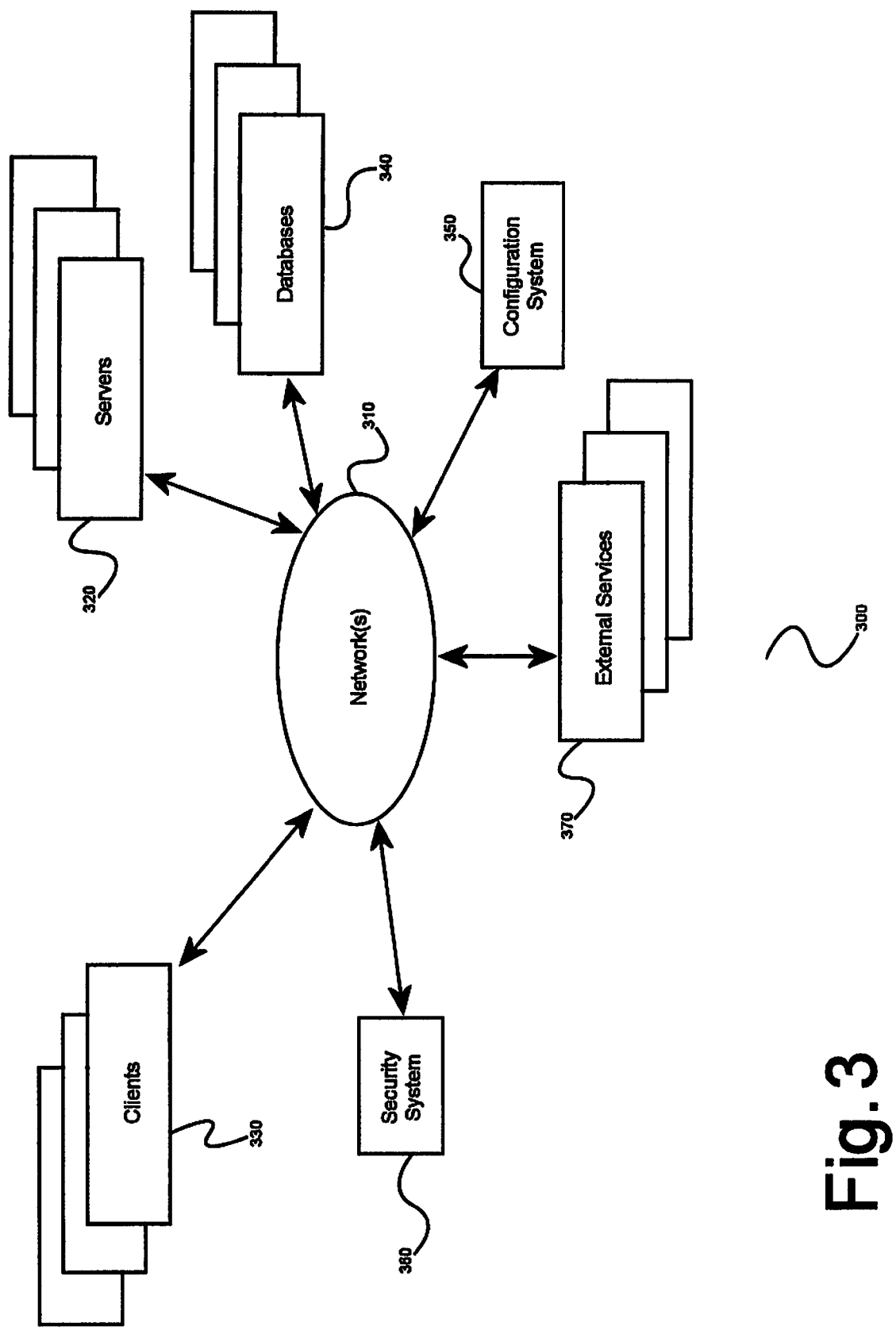
FIG. 3 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Description of System Architecture

Figure 4:
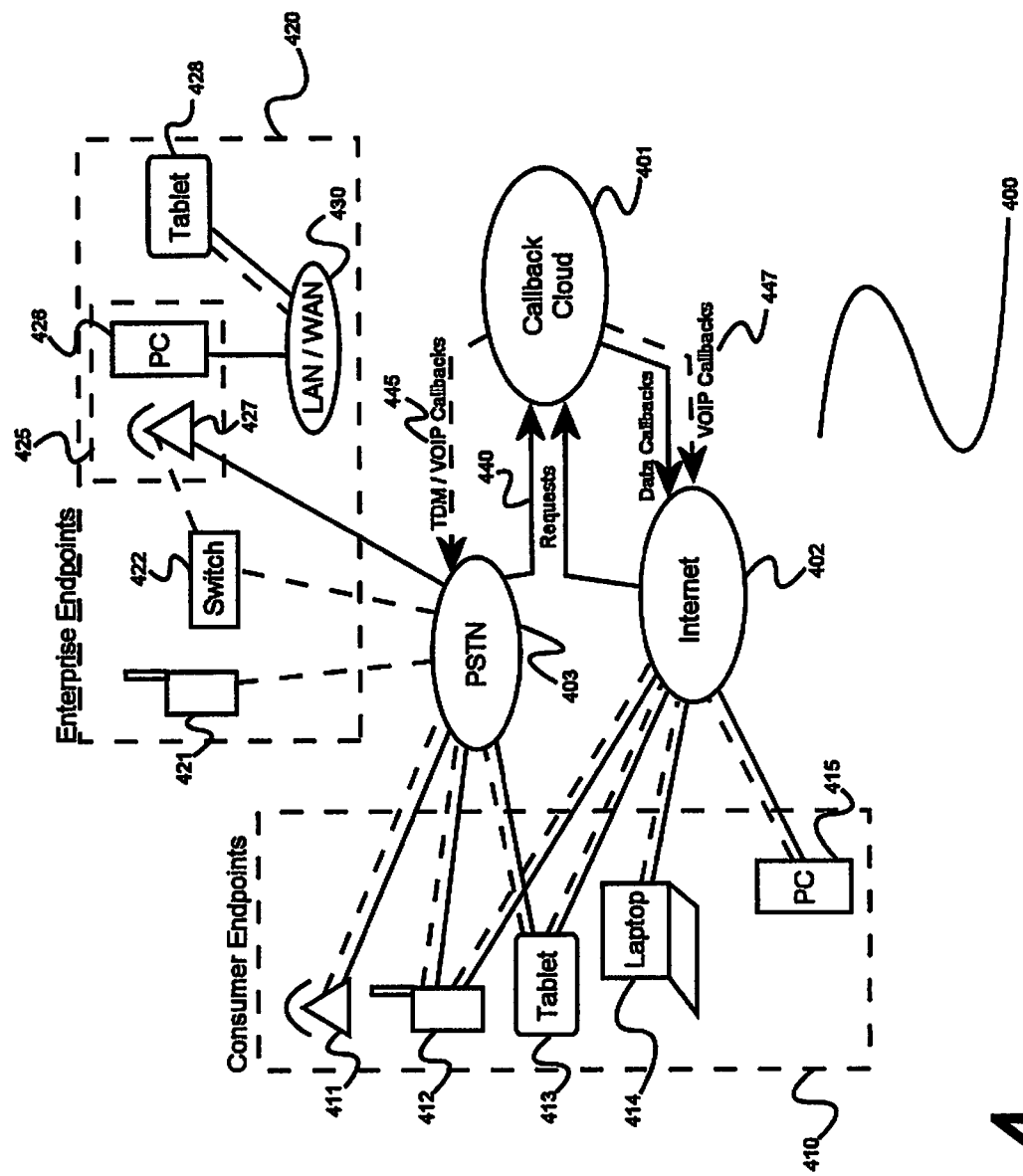
FIG. 4 is a block diagram illustrating an exemplary architecture of a system for a callback cloud, according to a preferred embodiment of the invention.

FIG. 4 is a block diagram of a preferred embodiment of the invention, illustrating an exemplary architecture of a system 400 for providing a callback cloud service. According to the embodiment, callback cloud 401 may receive requests 440 via a plurality of communications networks such as a public switched telephone network (PSTN) 403 or the Internet 402. Such communications networks may be connected to a plurality of consumer endpoints 410 and enterprise endpoints 420 as illustrated, according to the particular architecture of communication network involved. Exemplary consumer endpoints 410 may include, but are not limited to, traditional telephones 411, cellular telephones 412, mobile tablet computing devices 413, laptop computers 414, or desktop personal computers (PC) 415. Such devices may be connected to respective communications networks via a variety of means, which may include telephone dialers, VOIP telecommunications services, web browser applications, SMS text messaging services, or other data communications services. It will be appreciated by one having ordinary skill in the art that such means of communication are exemplary, and many alternative means are possible and becoming possible in the art, any of which may be utilized as an element of system 400 according to the invention. PSTN 403 (or alternatively Internet 402, not shown explicitly in FIG. 4 for simplicity) may be further connected to a plurality of enterprise endpoints 420, which may comprise cellular telephones 421, telephony switch 422, desktop environment 425, internal Local Area Network (LAN) or Wide-Area Network (WAN) 430, and mobile devices such as tablet computing device 428. As illustrated, desktop environment 425 may include both a telephone 427 and a desktop computer 426, which may be used as a network bridge to connect a telephony switch 422 to an internal LAN or WAN 430, such that additional mobile devices such as tablet PC 428 may utilize switch 422 to communicate with PSTN 402. Telephone 427 may be connected to switch 422 or it may be connected directly to PSTN 402. It will be appreciated that the illustrated arrangement is exemplary, and a variety of arrangements that may comprise additional devices known in the art are possible, according to the invention. Callback cloud 401 may respond to requests 440 received from communications networks with callbacks appropriate to the technology utilized by such networks, such as data or Voice over Internet Protocol (VOIP) callbacks 447 sent to Internet 402, or time-division multiplexing (TDM) such as is commonly used in cellular telephony networks such as the Global System for Mobile Communications (GSM) cellular network commonly used worldwide, or VOIP callbacks to PSTN 403. Data callbacks 447 may be performed over a variety of Internet-enabled communications technologies, such as via e-mail messages, application pop-ups, or Internet Relay Chat (IRC) conversations, and it will be appreciated by one having ordinary skill in the art that a wide variety of such communications technologies are available and may be utilized according to the invention. VOIP callbacks may be made using either or both traditional telephony networks such as PSTN 403 or over VOIP networks such as Internet 402, due to the flexibility to the technology involved and the design of such networks. It will be appreciated that such callback methods are exemplary, and that callbacks may be tailored to available communications technologies according to the invention.

According to the embodiment, callback participants (a person or organization that makes callbacks using callback cloud, when requested) and users (callback requesters) may register with callback cloud 400. Callback participants generally provide detailed information about their availability to make callbacks, telecommunications data pertaining to generating callbacks (for instance, phone numbers and possibly queue numbers to which callback attempts from callback cloud 400 should be connected). Callback participants also typically provide information such as their names, phone numbers, logos, avatars, photographs, QR codes or other unique symbol or identifier (which may be completely arbitrary and chosen by the participant). For requesters, registration typically captures information including, but not limited to, their name, phone number (or other contact information such as instant messaging user identifier), as well as optional information such as hours when they desire callbacks to be made, hours which they designate as "off limits", special handling instructions, and the like. Requesters may be individuals, organizations or enterprises, or any other entity that may have need for a callback service. An exemplary method of registration is illustrated later in greater detail, referring to FIG. 9.

As an example of operation, an individual requester might register with callback cloud 400 and provide some level of personal information including (for example) a telephone number and hours during which such number might be used to reach them, as well as some information on products or services which they might be qualified to assist others with. According to the embodiment, another individual may register with callback cloud 400 for the purpose of requesting a callback from a previously registered individual, an exemplary method for which is described later in detail, with reference to FIG. 10.

Figure 5:
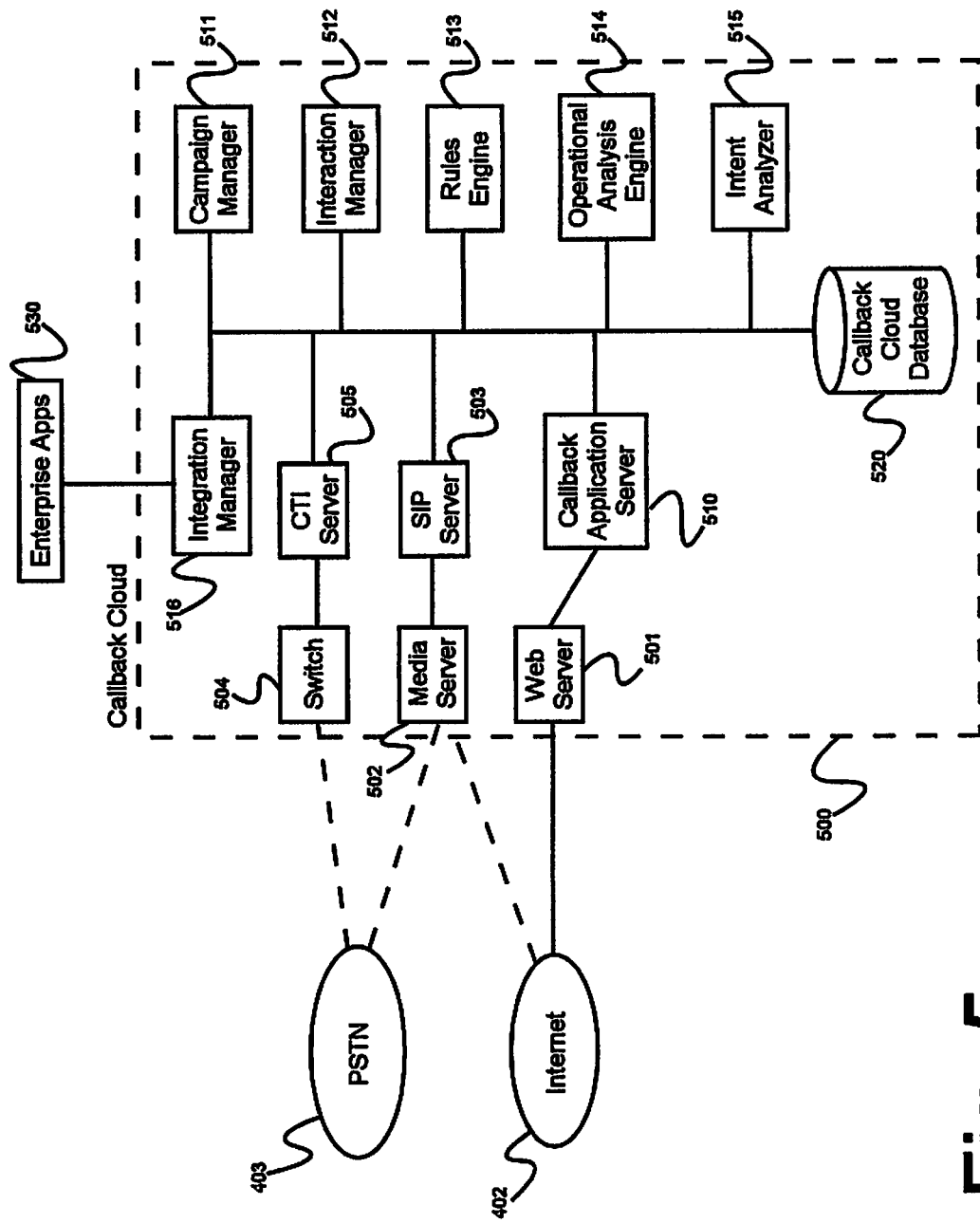
FIG. 5 is a block diagram illustrating an exemplary architecture of a callback cloud, according to a preferred embodiment of the invention.

FIG. 5 is a block diagram illustrating an exemplary architecture of a callback cloud 500, according to a preferred embodiment of the invention. According to the embodiment, a callback cloud 500 may comprise a plurality of front-end elements to accept incoming data requests, such as web server 501, which may accept requests from Internet 402, media server 502 which may accept requests from either Internet 402 or a PSTN 403, or telephony switch 504 which may accept requests from a PSTN 403. It will be appreciated that such elements are exemplary, and additional or alternate arrangements accepting requests from a variety of communications networks are possible according to the invention. Data requests may be passed from front-end services to secondary services for processing, such as CTI server 505, SIP server 503, or callback application server 510, each of which may translate incoming request data for interaction with a plurality of computer services, such as campaign manager 511 which may manage information about requesters such as when or why an interaction should take place between two resources, interaction manager 512 which may handle matching, distribution, and queuing of interactions with a plurality of processing parties such as agents, chatbots, or other virtual assistants or adding a request to a callback queue if a selected resource is busy, rules engine 513 which may receive incoming requests and apply predetermined or configurable rules to determine possible actions, such as when a callback is to be performed, to what available contact method a callback should be made, what to do if a callback attempt fails, how to prioritize a callback in a queue, or other relevant actions, operational analysis engine 514 which may work in conjunction with an intent analyzer 515 for the purpose of handling decision-making logic such as selecting and assigning resources to handle callback requests, such that callbacks will be handled by the most relevant and capable available resource. A "resource" in this case may refer to an individual, a contact center agent, an automated response application, chatbot, or other relevant party according to the nature of the callback request and, optionally, any rules assigned to the callback during processing as described previously. Callback cloud 500 may further comprise a database 520, which may collect and store requester data and may be any of a variety of database types, such as an SQL-based relational database or distributed non-relational database such as Hadoop HDB. Callback cloud 500 may further comprise an integration server 516, which may connect to a plurality of enterprise applications 530. In general, switch 504 and media server 502 are examples of, and act as, media handling endpoints of callback cloud 500. Similarly, CTI server 505 and SIP server 503 are examples of, and act as, signaling components that may be further characterized as session management components. Operational analysis engine 514 is a software component used to analyze operational data such as call arrival rates, callback request and completion rates, availability patterns of skilled resources, interaction lengths of various kinds (channel types or skills), and so forth. Thus operational analysis engine 514 may be used to determine an optimal time for reaching a specific person based on patterns determined from historical data; it may be used to determine when (or if) to expose a callback button or link on a web page based on for example inbound call volumes (which can be used to compute an estimate of resources that will be available in a certain period based on an expected call arrival rate and an expected staffing level for that period); or it can be used to select an optimal channel for a given callback based on an analysis of which channels are most successful at different times for the person or class of persons in question. Similarly, intent analysis engine 515 may be used to take an expression of intent (such as, "Get me Bob Sherman"), and to analyze it to determine whether, when, and how to connect the requester with Bob Sherman; such analyses may be based on a host of available data elements, such as stated preferences of the requester, communications capabilities or preferences of Bob Sherman, Bob Sherman's work schedule, corporate security or availability policies, and so forth. Intent analysis engine 515 may determine what channel to use, how many attempts to make before signaling failure, and also what targets to use (sometimes a user will express an intent such as "get me a service expert for dishwashers", and intent analysis engine 515 may determine which resources may be considered for conducting a callback). Similarly, rules engine 513 may be used to store and test a plurality of rules set by default, by a specific enterprise, by a requester, or by the system, in order for example to determine using conventional rules-based techniques whether a callback is in fact authorized, or whether it must be scheduled for a later time, and so forth. In some embodiments, one or more instances of rules engine 513, operational analysis engine 514, and intent analyzer 515 may reside and operate on a single machine or even as a single executable program; the three components are shown separately in FIG. 5 and elsewhere in order to highlight their various logical functions within callback clouds of the invention.

Figure 6:
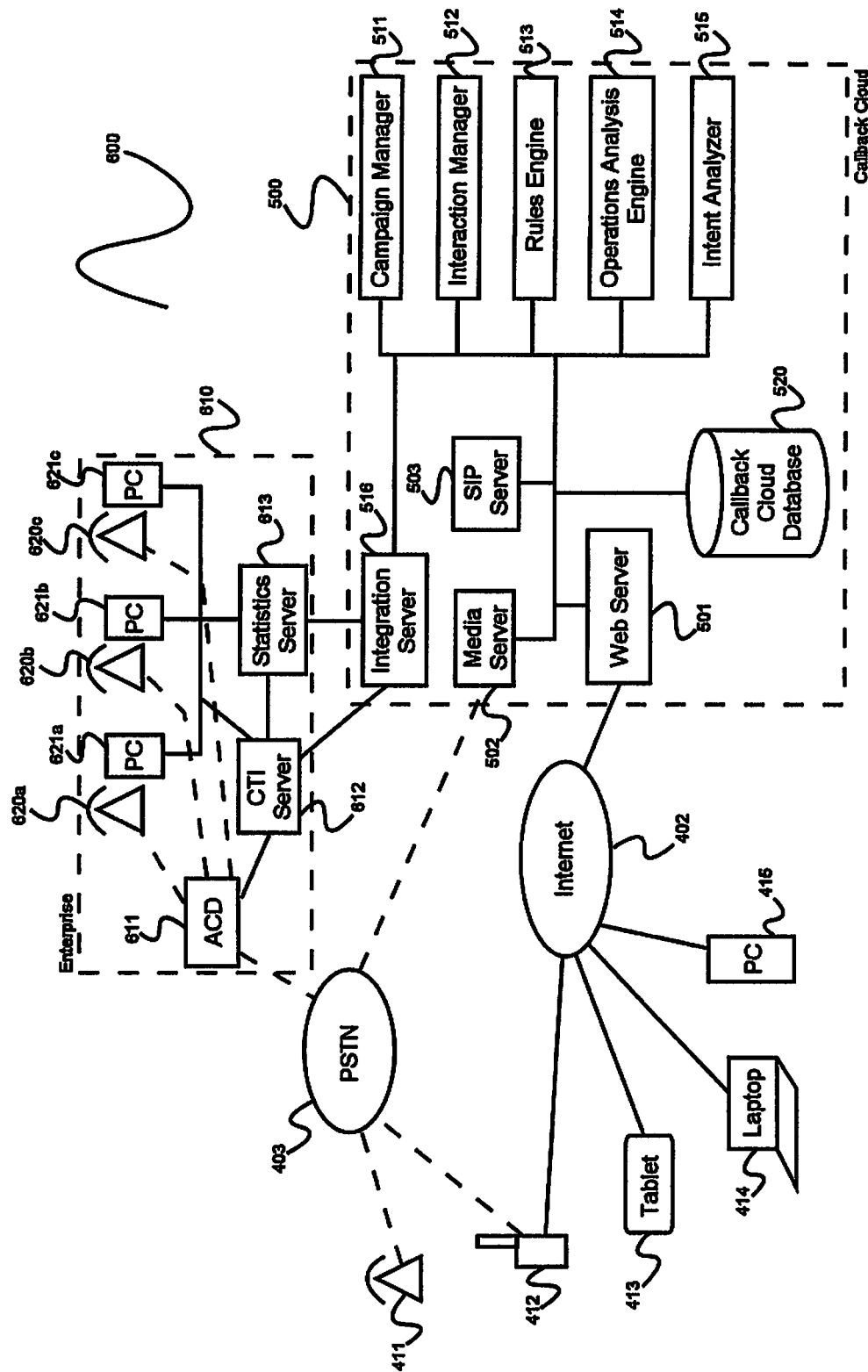
FIG. 6 is a block diagram illustrating a further exemplary architecture of a system for a callback cloud working with an enterprise contact center, according to an embodiment of the invention.

FIG. 6 is a block diagram illustrating an exemplary architecture of a system 600 comprising a callback cloud 500, which may be connected to PSTN 403, Internet 402, or an enterprise endpoint 610, according to an embodiment of the invention. According to the embodiment, a callback cloud 500 may comprise a plurality of front-end elements to accept incoming data requests, such as web server 501 which may accept requests from Internet 402, and media server 502 which may accept requests from a PSTN 403. It will be appreciated that such elements are exemplary, and additional or alternate arrangements accepting requests from a variety of communications networks are possible according to the invention. Data requests may be passed from front-end services to secondary services for processing, such as SIP server 503 which may translate incoming request data for interaction with a plurality of computer services, such as campaign manager 511 which may manage information about requesters such as when or why an interaction should take place between two requesters, interaction manager 512 which may handle matching, distribution, and queuing of interactions with a plurality of processing parties such as agents, chatbots, or other virtual assistants, rules engine 513 which may receive incoming requests and apply predetermined or configurable rules to determine whether a callback is appropriate, operational analysis engine 514, or intent analyzer 515 which may handle decision-making and assigning resources to handle callback requests. Callback cloud 500 may further comprise an integration server 513 which may connect to an enterprise endpoint 610 via CTI server 612 or statistics server 613, each of which may be internal to enterprise endpoint 610 and which handle the routing of data between callback cloud 500 and a plurality of enterprise user workstations, each of which comprising a telephone 620 or similar telecommunications device and a PC 621, and which may also be further connected to an Automatic Call Distributer (ACD) 611, which handles the routing and distribution of telephony calls between enterprise users and a PSTN 403. PSTN 403 may be connected to a plurality of consumer endpoints, such as a telephone 411 or cellular phone 412. Internet 402 may be similarly connected to a plurality of consumer endpoints, such as cellular phones 412, tablet computing devices 413, laptop PCs 414, or desktop PCs 415. It will be appreciated by one having ordinary skill in the art that such configurations are exemplary, and alternate configurations are possible according to the invention.

As an example, when a requester submits a callback request for a previously registered participant, their request might be sent to an interaction manager 512 for initial handling. Interaction manager 512 might then determine that callback-specific rules need to be applied (such as when an individual might request a callback in reference to a company's product or services, necessitating that the resource chosen to complete the callback request at least be knowledgeable about the subject matter), and request is then sent to rules engine 513 to apply any necessary rules or conditions and determine how to further process request. Continuing with the above example, the request might then be sent to either or both an analysis engine 514 or intent analyzer 515 for determination of which resource to complete a callback, based on previously-determined information and rules specific to this interaction. The request now has enough information to attempt an interaction, and interaction manager 512 may then attempt to complete a callback by connecting the requester to the chosen resource, or add the interaction to a new or existing queue if the resource is currently unavailable, such as a contact center agent currently engaged in a previous interaction. An exemplary method for this process is described in greater detail later, referring to FIG. 11.

Figure 7:
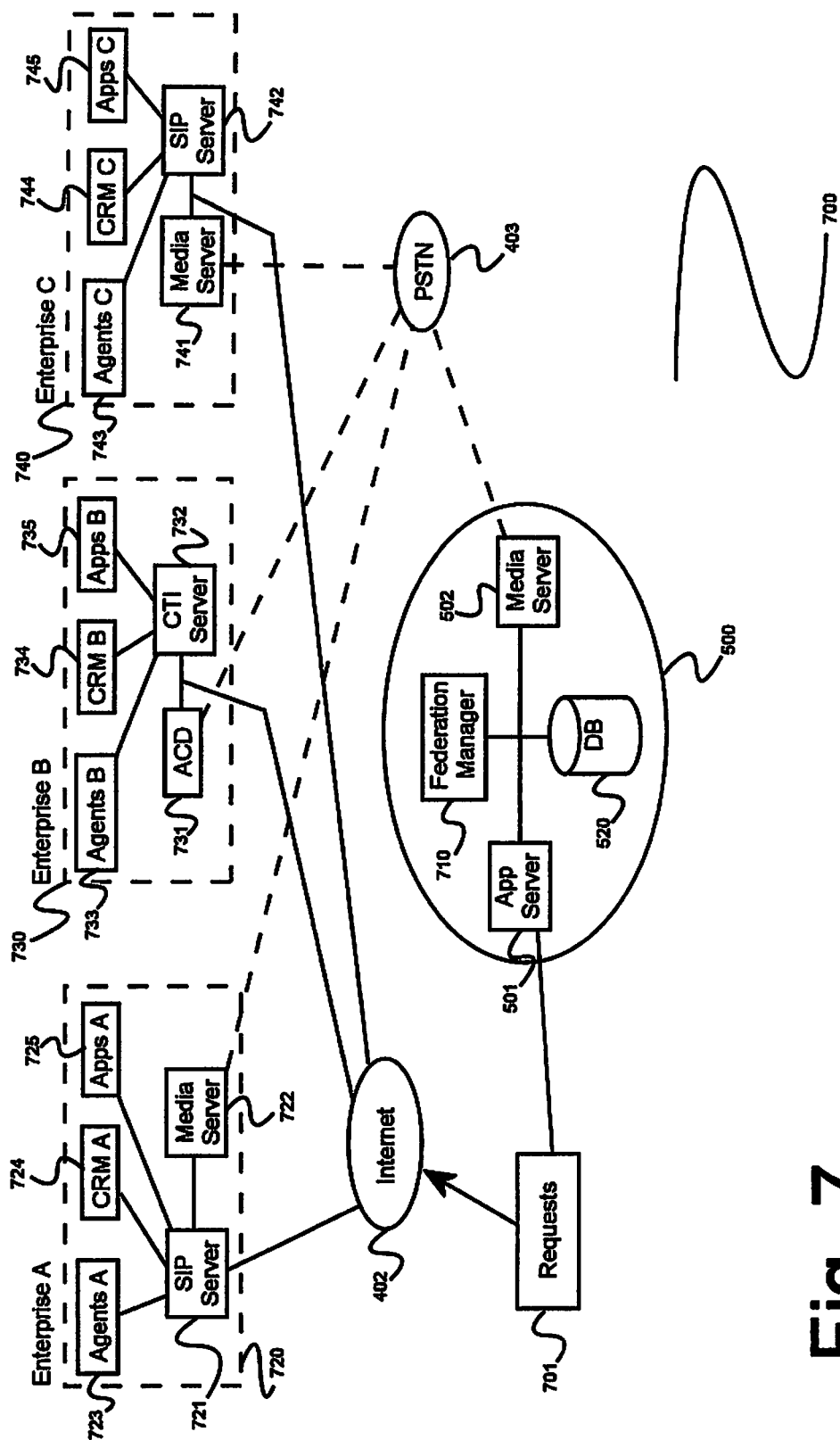
FIG. 7 is a block diagram illustrating a further exemplary architecture of a system for a callback cloud working as a federating agent, according to an embodiment of the invention.

FIG. 7 is a block diagram illustrating an exemplary architecture of a system 700 comprising a callback cloud 500 further comprising a federation manager 710 which may handle interactions between a plurality of enterprise endpoints as shown, which may be connected to PSTN 403, which may then be connected to a plurality of enterprise endpoints via a variety of means such as a media server 722, ACD 731, or media server 741, each of which may then be connected to a request handler internal to an enterprise endpoint, such as SIP server 721, CTI server 732, or SIP server 742. In this manner callback cloud 500 may provide federated customer service for enterprise endpoints such that requests may be handled optimally by a plurality of endpoints for any exemplary enterprise, and such that a requester need not necessarily be aware of their plural nature. As illustrated, request handlers (such as SIP server 721, CTI server 732, or SIP server 742, previously described) may be further connected to Internet 402, which relays incoming requests 701. As illustrated in exemplary enterprise endpoint A 720, a SIP server 721 may be connected internally to enterprise agents 723, Customer Relationship Management server 724, or enterprise applications 725. In an exemplary enterprise B 730, a CTI server 732 may be connected to enterprise agents 733, CRM server 734, or enterprise apps 735 as well as directly connected to Internet 402 such that it may accept data requests directly without the need for an ACD 731. In an exemplary Enterprise C 740, a SIP server 742 may be connected to enterprise agents 743, CRM 744, or enterprise apps 745, as well as directly to Internet 402 such that it may directly accept incoming data requests without the need for a media server 741. It will be appreciated by one having ordinary skill in the art that such configurations are exemplary, and that a wide variety of enterprise architectures are possible according to the invention.

As an example, when an individual requests a callback from an enterprise entity, they may only perceive a single contact point such as a customer service number or tech support e-mail address. When a callback request is submitted, during the handling process internal to callback cloud 500 a federation manager 710 is consulted, which may contain stored information about a plurality of actual enterprise endpoints such as individual contact centers or tech support personnel, each of which has a unique contact that need not be exposed to the requester. An exemplary method for this is discussed in greater detail later, referring to FIG. 12.

Figure 8:
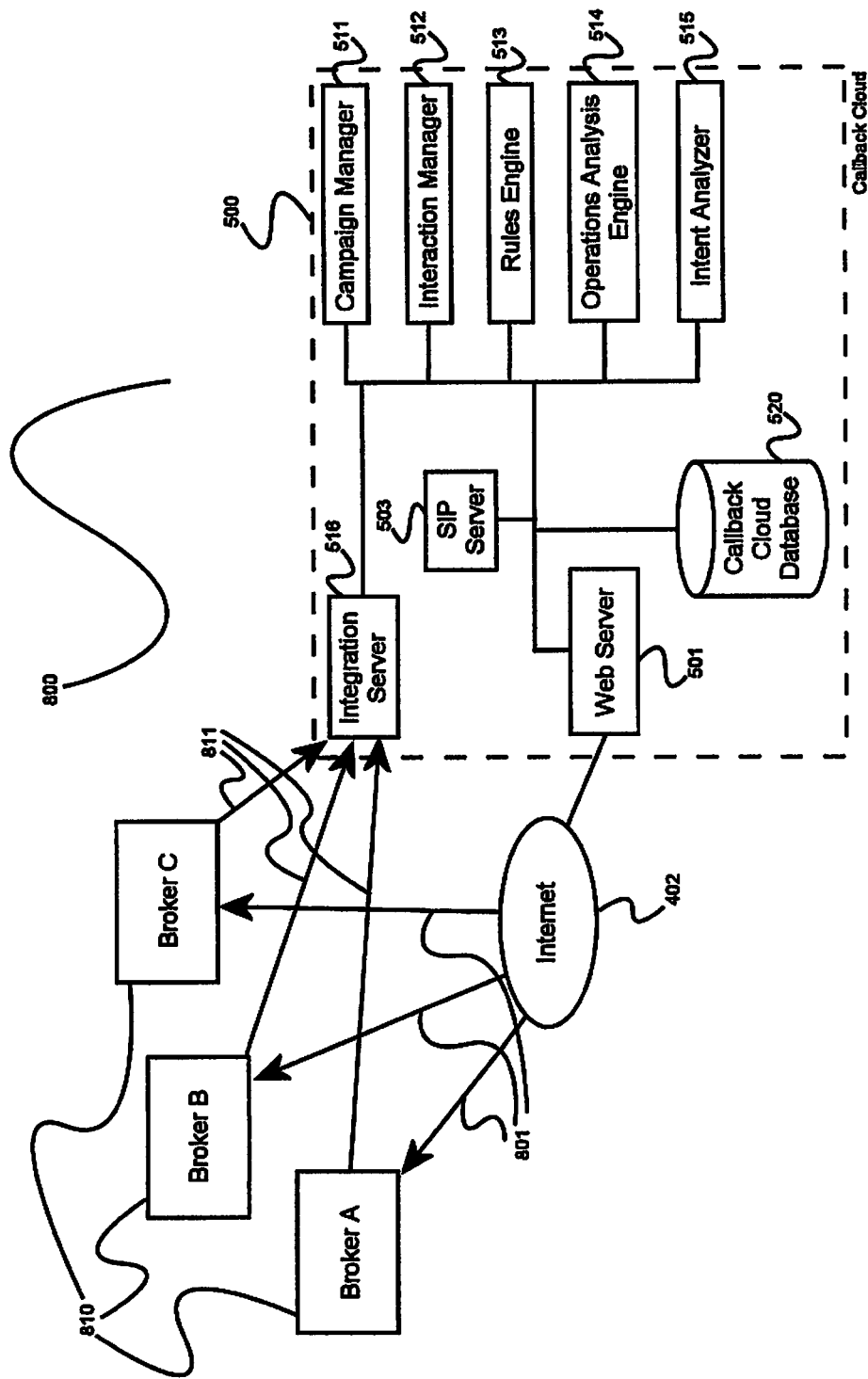
FIG. 8 is a block diagram illustrating a further exemplary architecture of a system for a callback cloud working with service brokers, according to an embodiment of the invention.

FIG. 8 is a block diagram illustrating an exemplary architecture of a system 800 comprising a callback cloud 500, which may be connected to Internet 402, which may be further connected to a plurality of service brokers 810, which may receive incoming requests 801, which may then be consolidated and sent to callback cloud 500 via an integration server 516, according to an embodiment of the invention. According to the embodiment, a callback cloud 500 may comprise a plurality of front-end elements to accept incoming data requests, such as web server 501 which may accept requests from Internet 402. It will be appreciated that such elements are exemplary, and additional or alternate arrangements accepting requests from a variety of communications networks are possible according to the invention. Data requests may be passed from front-end services to secondary services for processing, such as SIP server 503 which may translate incoming request data for interaction with a plurality of computer services, such as campaign manager 511 which may manage information about requesters such as when or why an interaction should take place between two requesters, interaction manager 512 which may handle matching, distribution, and queuing of interactions with a plurality of processing parties such as agents, chatbots, or other virtual assistants, rules engine 513 which may receive incoming requests and apply predetermined or configurable rules to determine whether a callback is appropriate, operational analysis engine 514, or intent analyzer 515 which may handle decision-making and assigning resources to handle callback requests. Callback cloud 500 may further comprise an integration server 513 which may receive incoming consolidated requests 811 from brokers 810.

As an example, when a requester submits a callback request to a callback cloud 500, a portion of the internal request handling is dedicated to determining the intent or nature of the callback, such as any products or services the request may be in reference to, or any rules specific to the enterprise from which a callback is requested. According to the embodiment, this handling need not be performed internal to a callback cloud, and may be distributed to one or more external service brokers 810 with their own internal handling procedures and stored information, in such a way that callback cloud 500 operation may be further distributed and optimized. An exemplary method for this operation is discussed later in greater detail, in reference to FIG. 13.

Description of Method Embodiments

Figure 9:
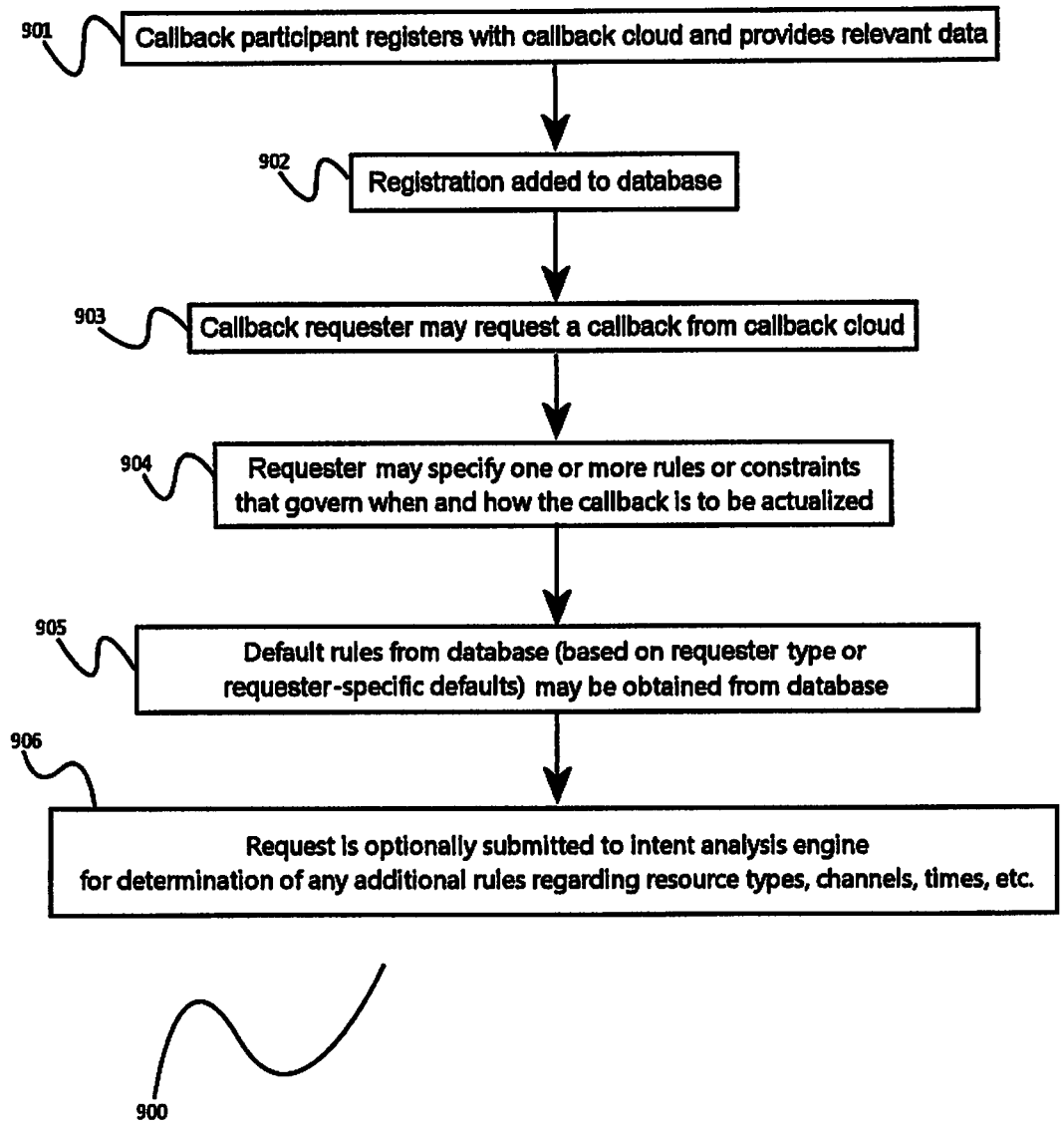
FIG. 9 is a method flow diagram illustrating a basic callback attempt, according to an embodiment of the invention.

FIG. 9 is a process flow diagram illustrating a method 900 for providing a callback cloud service. In an initial step 901, callback participants register with a callback cloud service and provide some initial relevant information, such as their name, telephone number, logo, avatar, photograph, QR code, or other symbol that can be used to uniquely identify the user. Such a user may be an individual, group of persons, an organization, or any of a variety of other entities. In step 902, this registration information may be added to a database in the callback cloud, and added to an existing store of registered callback participants and information. In step 903, a callback requester may request a callback from the cloud, and in step 904 the callback requester may specify one or more rules or constraints governing when and how such a callback is to be actualized. In step 905 any default rules may be obtained from the cloud database, based on such criteria as the user type, callback request type, user-specific defaults, or other criteria. Rules implemented may include scheduled callback times or time ranges, conditions to be met for a callback to take place (Such as when a product is released, or when another user is within their scheduled time range for availability), or queue-based rules determining that a callback is to be placed based on its position in a queue relative to other, similar callback requests. It will be appreciated that such rules and criteria are exemplary, and a multitude of criteria and information may be relevant and used according to the invention. In step 906 the callback request may be optionally sent to an intent analysis engine 515 to determine if any further additional rules may be applied based on available information such as resource types, channels available, or other internal information that may not be available to a user for self-expressed rules as described above.

Figure 10:
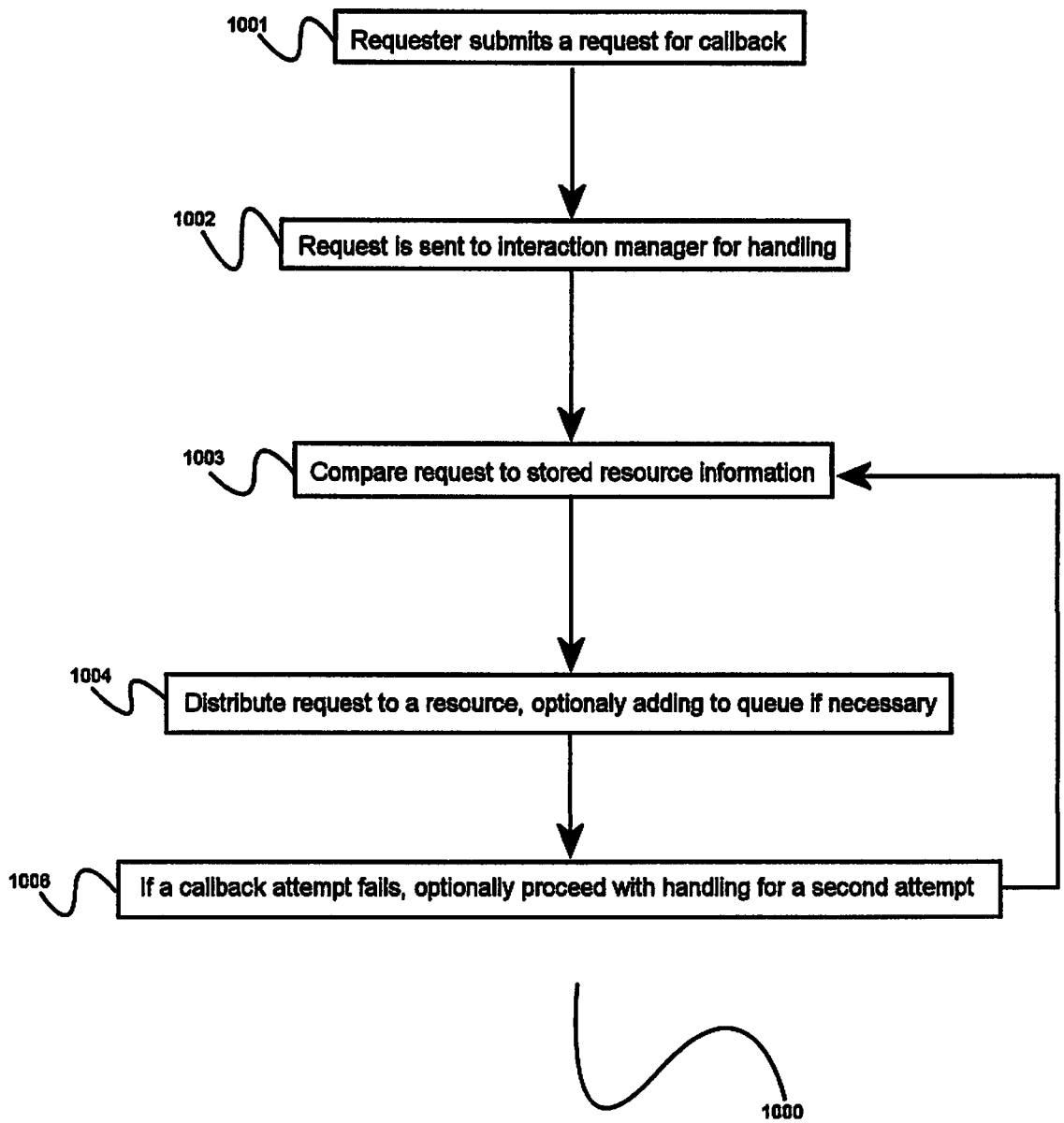
FIG. 10 is a method flow diagram illustrating a contact center callback from a callback cloud, according to an embodiment of the invention.

FIG. 10 is a process flow diagram illustrating an exemplary method 1000 for providing a callback service to a contact center, such as might be utilized when a requester submits a callback request from an enterprise customer service department. In an initial step 1001, a requester submits a request for callback to the callback cloud. Such a requester may be an individual, group, enterprise, or other entity that might need to contact an enterprise endpoint comprising a contact center. In step 1002, request is sent to an interaction manager 512, which controls handling of the request. In step 1003, interaction manager 512 may compare the request to known resource information which may be stored in a database 520 to match the request with existing resources such as known identification or other relevant information about requester, preselected rules for requesters, registered callback participants such as registered enterprise contact centers, rules for handling contact request such as operating hours and contact center service details or ratings, how to handle a failed callback attempt should one or more parties be unreachable at the time a callback takes place, and to further determine which specific resource to match the request with for handling. In step 1004, interaction manager 512 may distribute the request to the selected resource, and optionally may add the request to an existing queue if selected resource is presently unavailable. In a final step 1005, interaction manager optionally determines whether to loop back to step 1003 for further examination after a failed callback attempt, to determine handling for a second callback attempt.

Figure 11:
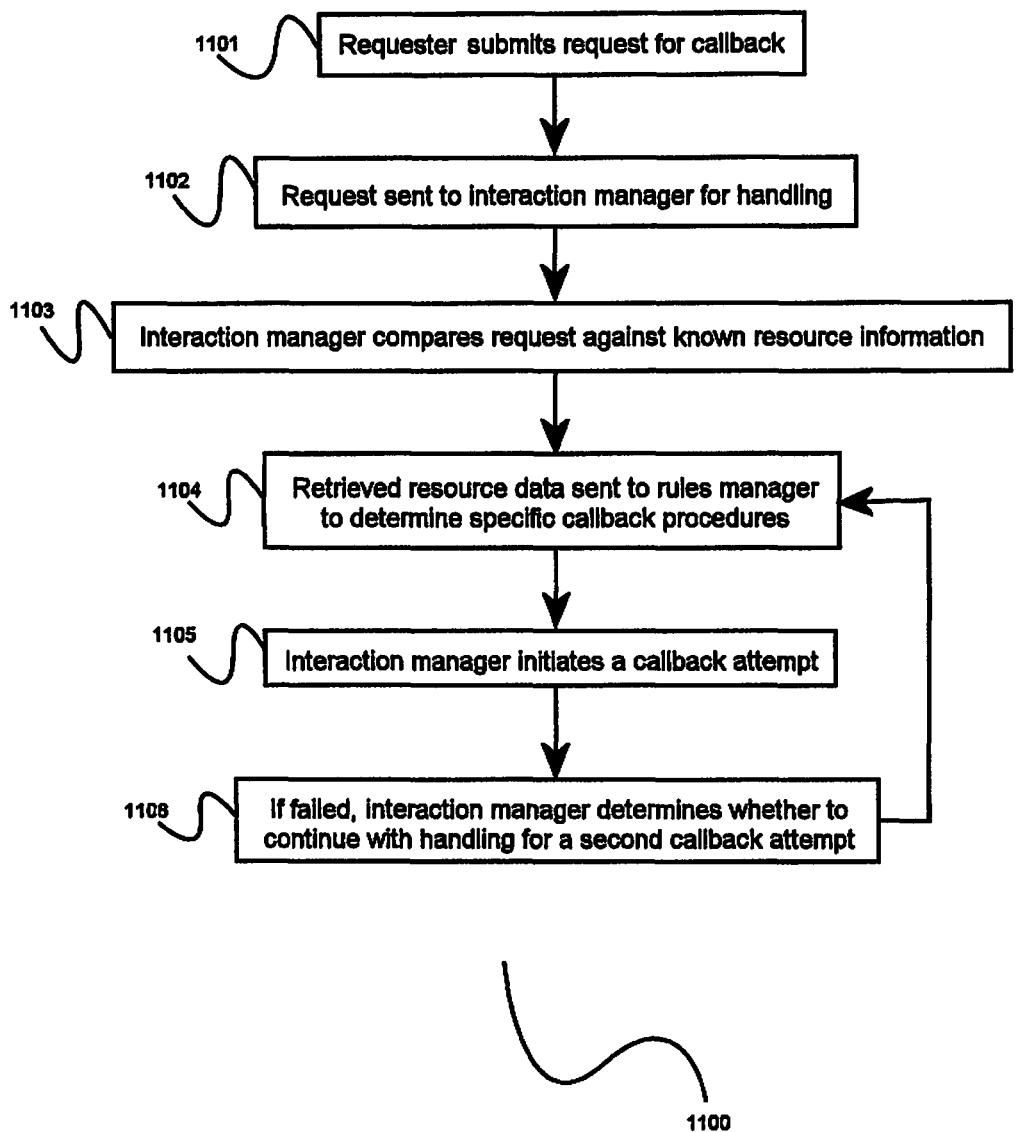
FIG. 11 is a method flow diagram illustrating consumer-to-consumer callback cloud operation, according to an embodiment of the invention.

FIG. 11 is a process flow diagram illustrating a method 1100 for providing a consumer-to-consumer (C2C) callback service, such as might be utilized when a requester submits a callback request from a known individual (target) rather than from a customer service endpoint such as, for example, an enterprise contact center or automated response system. In an initial step 1101, a requester submits a request for callback to a callback cloud. Request may then be sent to interaction manager 512 for handling in step 1102, and in step 1103 interaction manager 512 may compare request data against known data such as identification or other information relevant to requester, known information about the resource form which the callback was requested, such as availability times or contact information, predefined rules or other resource- or interaction-specific details, which may be stored in a database 520, as described above. In step 1104, interaction manager 512 may send this information to rules manager 513 which may act upon the retrieved resource information to determine specific callback procedures such as when a callback should be scheduled to take place based on specified availability times or trigger events, what contact numbers should be used for each participating party, how to react if a callback attempt should fail to reach one or both parties, or other rules defined either globally by one or both parties or defined specifically for this interaction by requester. In step 1105, interaction manager 512 may attempt to complete a callback request when the rules or conditions have been met, if any, and connect requester with the target resource from which a callback was requested. In a final step 1106, interaction manager 512 may re-examine the callback conditions in the event of a contact failure, and optionally determine whether to loop back to step 1104 for handling of a second callback attempt.

Figure 12:
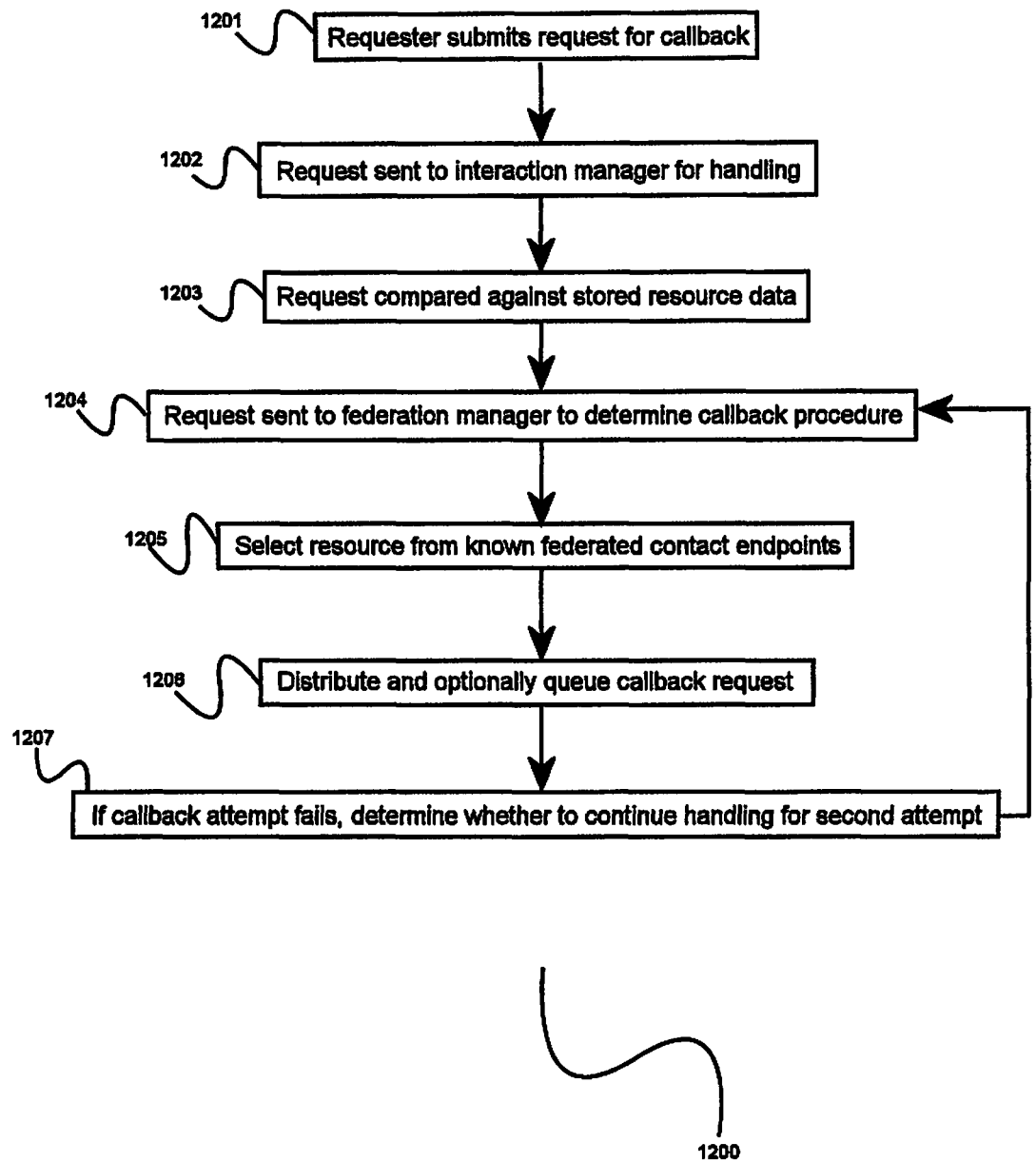
FIG. 12 is a method flow diagram illustrating federated customer service via a callback cloud, according to an embodiment of the invention.

FIG. 12 is a process flow diagram illustrating a method 1200 for providing federated customer service via a callback cloud, such as might be utilized when a requester submits a callback request from an enterprise contact comprising a plurality of contact centers operating independently, optionally with varied contact information, rules or conditions, while serving jointly as contact endpoints for a single enterprise with optionally global rules governing callback interactions or contact conditions. In an initial step 1201, a requester submits a request for callback to a callback cloud. Request may then be sent to interaction manager 512 for handling in step 1202, and in step 1203 interaction manager 512 may compare request data against known data such as identification or other information relevant to requester, known information about the resource form which the callback was requested, such as availability times or contact information, predefined rules or other resource- or interaction-specific details, which may be stored in a database 520, as described above. In step 1204, interaction manager 512 may send this information to federation manager 710 which may act upon the retrieved resource information to determine specific callback procedures such as when a callback should be scheduled to take place based on specified availability times or trigger events, what contact numbers should be used for each participating party, how to react if a callback attempt should fail to reach one or both parties, or other rules defined either globally by one or both parties or defined specifically for this interaction by requester, and which handles any rules that may apply across a plurality of potential enterprise contact endpoints that may act collectively as contact resources for a single enterprise entity. In step 1205, federation manager 710 may select a contact resource from known federated contact endpoints, and returns this resource to interaction manager 512 for queuing or completion of callback attempt. In step 1206, interaction manager 512 may distribute the request to the selected resource, and optionally may add the request to an existing queue if selected resource is presently unavailable. In a final step 1207, interaction manager 512 may re-examine the callback conditions in the event of a contact failure, and optionally determine whether to loop back to step 1204 for handling of a second callback attempt.

Figure 13:
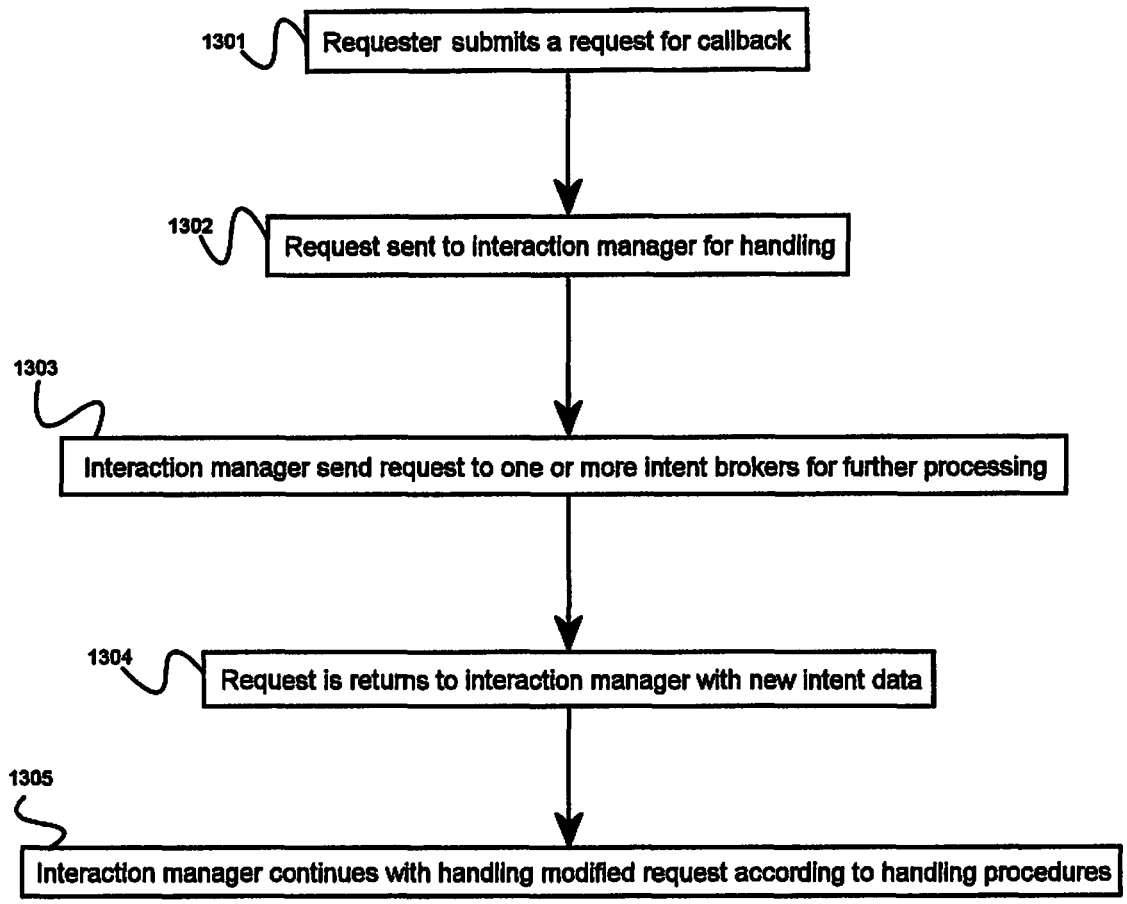
FIG. 13 is a method flow diagram illustrating aggregated intention management by a broker, according to an embodiment of the invention.

FIG. 13 is a process flow diagram illustrating a method 1300 for providing aggregated intention management via service brokers 810 optionally in place of or in addition to intent manager 515 or rules engine 512. In an initial step 1301, a requester submits a request for callback to a callback cloud. In step 1302 request may be sent to an interaction manager 512, which may route request to one or more service brokers 810 for intent management in step 1303. Service brokers 810 may perform analysis of request to determine handling criteria or rules such as required skills, potentially relevant rules, or potentially relevant contact resources for handling request. In step 1304 a modified request is returned to interaction manager 512 for further handling with new intent data taken into account. Interaction manager 512 may then continue with handling in step 1305, according to the nature of the callback request such as C2C, request for a contact center, or other interaction type as previously described.

Figure 14:
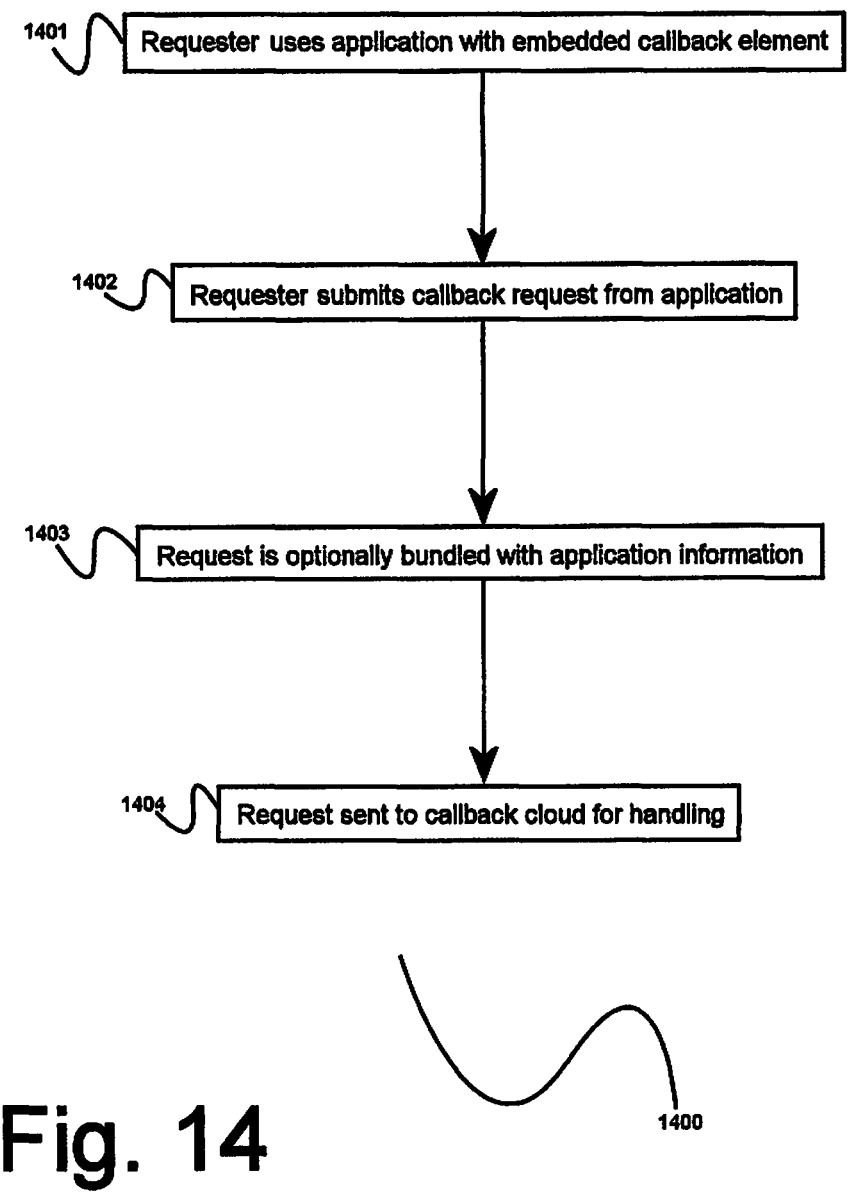
FIG. 14 is a method flow diagram illustrating an application callback scenario, according to an embodiment of the invention.

FIG. 14 is a process flow diagram illustrating a method 1400 for an application callback scenario, such as might be utilized when a callback function is embedded within an application such that a user (requester) may request a callback directly from within the application without necessarily knowing any contact information for a target resource that will respond to the request. In an initial step 1401, a requester may be using an application on a computing device such as a mobile phone, tablet computing device, a laptop, or desktop PC. Such devices are exemplary, and it will be appreciated that any electronic or computing device capable of supporting user-interactive applications or programs may be used according to the invention. In step 1402, requester may request a callback from within an application via an embedded interface element such as a popup, menu, or button. In step 1403, request from application may be enhanced or "bundled" with relevant information gathered from the application such as individual or enterprise contact endpoints, specific products or services, requester's contact information, or other relevant information that may be obtained from the requesting application. In step 1404, request and any bundled information may be sent to a callback cloud for handling or distribution according to the nature of the request, as described previously.

Figure 15:
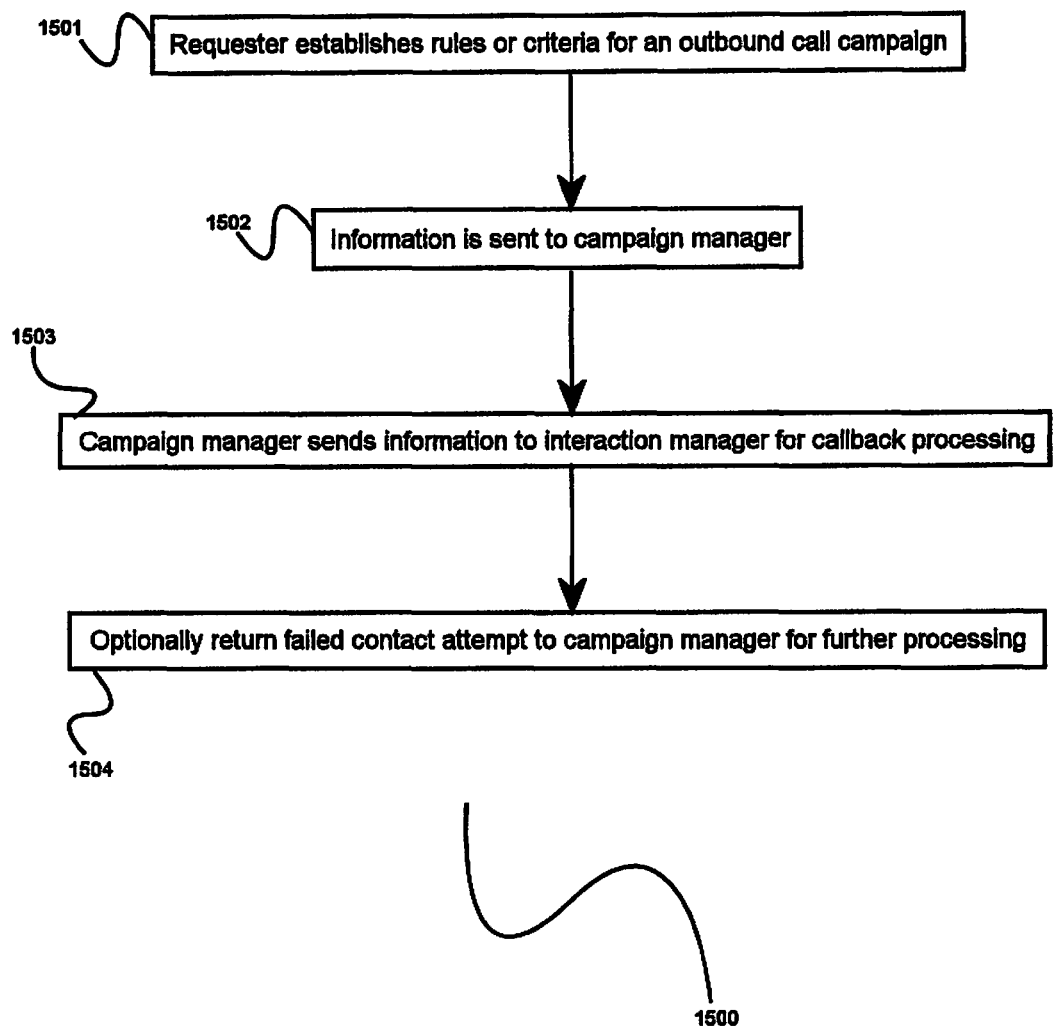
FIG. 15 is a method flow diagram illustrating campaign management, according to an embodiment of the invention.

FIG. 15 is a process flow diagram illustrating a method 1500 for campaign management using a callback cloud, such that a callback cloud may provide for outbound functionality in addition to accepting inbound requests, and may handle optimization logic or scheduling for callback interactions. In an initial step 1501, a requester may establish rules for running an outbound campaign within a callback cloud, optionally establishing rules or criteria for such parameters as target resources (what numbers to call), prioritizing resources based on defined criteria such as (for example) likelihood of contact success or potential profitability, timeframes for outbound calls, decision-making logic for selecting resource contact information (which numbers to call, what contact method to use such as sending a text message to a cellular number vs. a voice call), optimization logic for outbound dialing such as the use of predictive or progressive dialing, or post-dialing logic such as any scripts to be run or prompts to present to an agent upon establishing an interaction, or how to handle a failed callback attempt. According to the embodiment, requester may be an individual, organization, enterprise, or any other entity that may desire to conduct an outbound calling campaign, such as (for example) an enterprise contact center calling potential customer or a public figure campaigning for public support. In step 1502, campaign manager 511 may consult known rules specific to a campaign for the purpose of initiating an outbound callback, optionally in conjunction with rules engine 513 for rules specific to resources or interactions but not applicable to a campaign globally. Campaign-specific rules may include, but are not limited to, specific rules or policies of an enterprise or individual conducting a campaign, or procedures to be used such as predictive or progressive dialing techniques for outbound contact attempts. Predictive dialing techniques may allow a contact center to optimize agent scheduling by dialing an outbound contact number based on known factors such as handle or response times (such as, for example, if an agent is known to have an average call handle time of 180 seconds and outbound calls have an average wait time of ten second before being answered, an outbound number may be dialed 170 seconds into a current interaction such as to minimize downtime where agent is not engaged in an interaction), and progressive dialing techniques may allow for optimized call handling by presenting information relevant to an outbound contact attempt to an agent prior to dialing a contact number, allowing an agent time to review information prior to an interaction. In step 1503, campaign manager 511 may send an interaction request to interaction handler 512, optionally bundled with information specific to campaign or interaction in particular, for interaction handling and processing as described previously. In a final step 1504, interaction manager 513 may perform post-attempt handling such as (for example) determining whether to send information back to campaign manager 511 and loop to step 1501 for further processing after a failed contact attempt. It will be appreciated by one having ordinary skill in the art that such campaign and contact descriptions are exemplary, and many possible approaches may be used according to the invention, and that there are many ways in which campaign management may be desirable to an individual, enterprise, or other entity.

Figure 16:
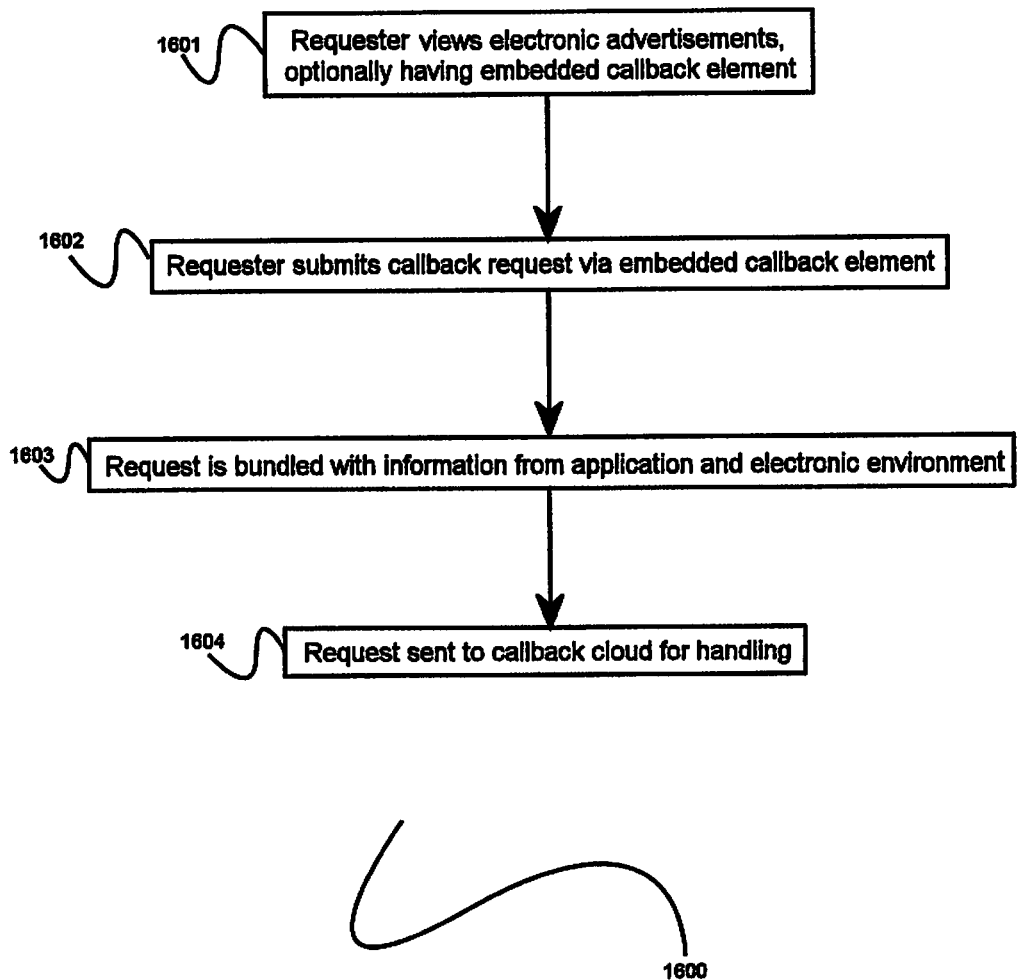
FIG. 16 is a method flow diagram illustrating search-based ad callbacks, according to an embodiment of the invention.

FIG. 16 is a process flow diagram illustrating a method 1600 for search-based embedded ad callbacks with estimated wait times (EWTs). In an initial step 1601, a requester may be viewing advertisements embedded in a displayed webpage or other electronic document, such as commonly seen in search engine results or on electronic storefronts, any of which may have embedded callback elements such as buttons, popups, or other elements alerting requester to the possibility of a callback and potentially allowing the request thereof. It will be appreciated by one having ordinary skill in the art that such instances are exemplary, and that the presence of embedded advertising is a growing feature in the art and many alternate scenarios are possible according to the invention. Such an advertisement with an embedded callback element may utilize known information about current interactions relevant to the advertisement, such as number or scheduling of available agents to handle interactions, number of current interactions in queue, or other relevant information to display EWT such that an appropriate expectation is set with requester. In step 1602, requester may submit a callback request via an embedded element in an advertisement being viewed, such as a button or popup that may notify requester that a callback is possible. In step 1603, callback request may be bundled with relevant information gathered from the advertisement or requester's computing device, such as relevant contact endpoints, products or services, geographical location, browser preference, or any other potentially relevant information. In step 1604, request with any bundled information may be sent to a callback cloud for handling or distribution according to the nature of the request, as described previously.

Figure 17:
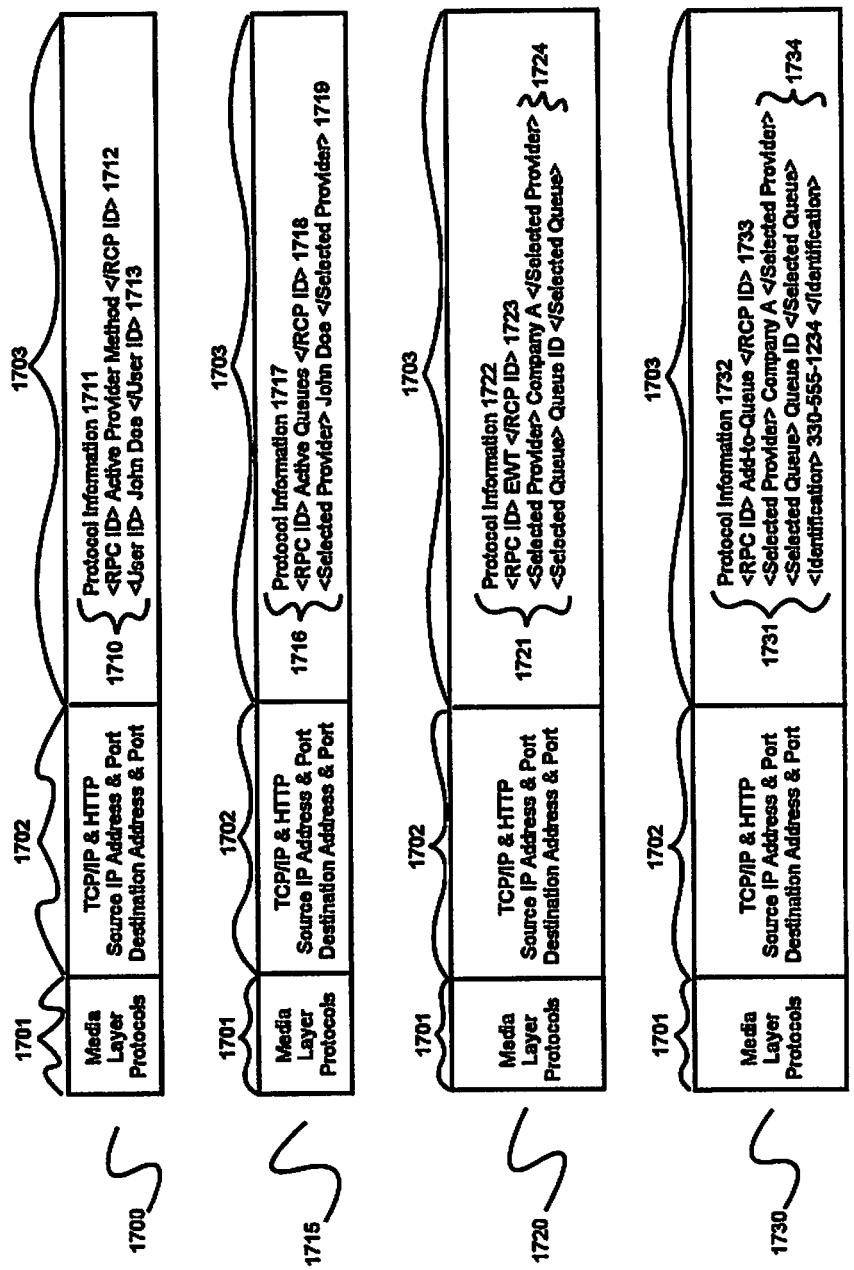
FIG. 17 is a block diagram illustrating exemplary messaging structures, according to an embodiment of the invention.

FIG. 17 is an illustration of exemplary messaging structures packaged with transport layer and media layer information. Message 1700 shows an exemplary embodiment of a structure for communications or messages passing between communication devices 1900 and service providers. In this example, the structure of an active provider's remote processing call 1703 is shown. The structure may be an XML structure 1710 with applicable SOAP or other remote processing call protocol information 1711. The exemplary structure includes at least a method identifier 1712, which identifies the active provider routine or process as the remote process, and data arguments 1713 for the active provider routine. The data arguments 1713 may include at least identification of the user.

The remote processing call 1703 may be encapsulated within appropriate TCP/IP and HTTP headers and other transport layer information 1702 such as source IP address and source port number of the requesting device 1900 and destination IP address and destination port number of the sequence component. Such combination may be encapsulated within appropriate media layer protocols 1701 for transmission across physical communication media via various physical layer segments interconnecting the requesting device 1900 and the sequence component.

Messages 1715, 1720, and 1730 show exemplary structures of other messages or communications within system 400 similar to that of active providers remote processing call 1703. The other communications that may be similarly structured, encapsulated, and transported may include the active queue remote processing call 1703 (message 1715), expected wait time call 1703 (message 1720), add-to-queue remote processing call 1733, the active providers message 1731, the active queue message 1733, the expected wait time message 1723, and the confirmation remote processing call 1703 (message 1730), for example.

Figure 18:
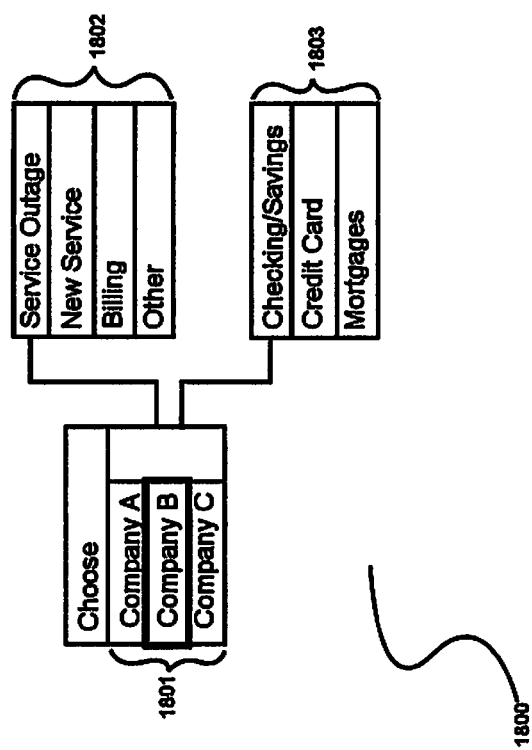
FIG. 18 is a block diagram illustrating an exemplary provider control and an exemplary service control, according to an embodiment of the invention.

FIG. 18 is a block diagram illustrating an exemplary provider control and an exemplary service control, according to an embodiment of the invention. Shown is an illustration of a provider control 1800. Provider control 1800 may be a drop down menu control that displays a group of providers 1801. From this menu, a user may select a provider from the selected business communication center.

Service control may be a drop down menu, which displays, for the selected provider, the services/queues of a group of services/queues 1802, 1803 associated with the selected provider's business communication center. A user may select a service from this menu.

Exemplary providers include Company A and Company B. For purposes of illustration, Company A may be a utility company and its services/queues associated with its business communication center may include a service/queue for reporting loss of services, a service/queue for handling billing matters, and a default service/queue for handling other matters.

Company B, for illustration, may be a bank and its services/queues associated with its business communication center may include a service for handling of checking, savings, or other deposit accounts, a service for handling credit card accounts, a service for handling mortgage accounts, and a default service for handling other matters.

FIG. 19A illustrates an embodiment of the system for managing, directing, and queuing communication events that uses an image sensor located on a communication device 1908 (e.g., a mobile communicating device) to capture an image of a company logo 1902 located on, for example, a product and cross-references the captured company logo 1904 with a database of company contacts. Various available queues, divisions, or individual contacts may be made shown and viewed by the user. An embodiment of the system allows a user to submit a request for a callback, determines an expected wait time 1906, and places an outgoing call to the communication device 1908 after the expected wait time (or an approximately equivalent time) has passed. Alternatively, an embodiment of the system places an outgoing call to another communication receiving device (not shown) having the phone number provided by the user. One skilled in the art will appreciate that the expected wait time 1906 may be 0 minute and a call is placed immediately, connecting the user to a person or group of people eligible to provide information or answer questions.

FIG. 19B illustrates an embodiment of the system for managing, directing, and queuing communication events that uses an image sensor, such as a bar code scanner, located on, for example, a communication device 1918 (e.g., a mobile communication device) to scan a bar code 1912 located on, for example, a product's shipping box 1910. One skilled in the art will appreciate that the bar code scanner can be any scanner device, such as a stationary scanner device, handheld or kiosk. Various configurations of scanners are available on the market. The scanner may be removably plugged into the communication device 1918. An embodiment of the system retrieves the company information 1914 from the bar code 1912 and cross-references the company information 1914 with a database of company contacts. In one embodiment, the bar code refers directly to a particular queue. In another embodiment, the bar code refers to a set of queues. An embodiment of the system allows a user to submit a request for a callback, determines an expected wait time 1916, and places an outgoing call to the mobile device 1918 after the expected wait time (or an approximately equivalent time) has passed. Alternatively, an embodiment of the system places an outgoing call to another communication receiving device (not shown) having the phone number provided by the user. One skilled in the art will appreciate that the expected wait time 1916 may be 0 minute and a call is placed immediately, connecting the user to a person or group of people eligible to provide information or answer questions.

FIG. 19C illustrates an embodiment of the system for managing, directing, and queuing communication events that uses an image sensor, such as a QR code reader, located on, for example, a communication device 1928 (e.g., a mobile communication device) to scan a QR code 1922 located on, for example, a company's business card 1920. One skilled in the art will appreciated that the QR code reader can be located on any device, such as a non-mobile device or kiosk. Various configurations of QR code readers may be used. An embodiment of the system retrieves the company information 1924 from the QR code 1922 and cross-references the company information 1924 with a database of company contacts. In one embodiment, the QR code refers directly to a particular queue. In another embodiment, the QR code refers to a set of queues. In one embodiment, the system maintains a database of QR codes with additional data associated with the QR codes. In yet another embodiment, a third party maintains a QR code database for referral by the system. An embodiment of the system allows a user to submit a request for a callback, determines an expected wait time 1926, and places an outgoing call to the mobile device 1928 after the expected wait time (or an approximately equivalent time) has passed. Alternatively, an embodiment of the system places an outgoing call to another communication receiving device (not shown) having the phone number provided by the user. One skilled in the art will appreciate that the expected wait time 1926 may be 0 minute and a call is placed immediately, connecting the user to a person or group of people eligible to provide information or answer questions.

FIG. 9D illustrates an embodiment of the system for managing, directing, and queuing communication events that uses an image sensor, such as a QR code reader, located on, for example, a communication device 1938 (e.g., a mobile communication device) to scan a QR code 1932 located on, for example, a company's webpage 1930. One skilled in the art will appreciate that the QR code reader can be located on or connected to any device, such as a non-mobile device or kiosk. The QR code or image to be read can be rendered or created by many different electronic devices such as computers, laptops, tablet/pad devices, phones and other devices with visual displays. An embodiment of the system retrieves company information 1934 or product information from the QR code 1932 and cross-references the company information 1934 with a database of company contacts or product information with a set of queues. An embodiment of the system allows a user to submit a request for a callback, determines an expected wait time 1936, and places an outgoing call to the mobile device 1938 after the expected wait time (or an approximately equivalent time) has passed. Alternatively, an embodiment of the system places an outgoing call to another communication receiving device (not shown) having the phone number provided by the user. One skilled in the art will appreciate that the expected wait time 1936 may be 0 minute and a call is placed immediately, connecting the user to a person or group of people eligible to provide information or answer questions.

Embodiments of the system and method for managing, directing, and queuing communication events eliminate the need for a user to research, locate and find a specialist of a company to provide information or answer questions regarding a product. When a question about a product or service arises, a user can simply scan the bar code or QR code that is located in the store, on a brochure, on a coupon, or on the actual product, and initiate a callback from a specialist who can answer questions, provide information, or complete an order to be shipped. The specialist may be in any location including for example, a contact center, in the same store, or in a different store. Thus, a purchaser can obtain information about a particular product he is contemplating on purchasing while viewing the product at the store.

In another embodiment (not shown), a card is scanned to locate available queues for a user. Like the other images, the data on the card is associated either directly or indirectly to queues. In other words the card is associated directly to queues or with particular people or a business group of people. Those people or groups of people correspond to or are related to available queues. Virtually any type of card may be used with the system including for example, plastic, paper, magnetic, metal cards and the like, credit cards, store cards, VIP cards, money cards, gift cards, point cards, award cards, library card, cards associated with products or devices such as a doll's ID card or an automobile card, and cards associated with services.

An image device, or more particularly a card scanner, is used to read data from the card. The data from the card is sent to a central location that looks-up the card information and relates it to queues. Information about the queues is sent to the user. A session queuing component displays the associated queues to the user. Estimated wait time information may or may not be made available to the user. Using this queue information, the user is able to select a desired queue or queues. A callback or scheduled call can then be arranged. As with the other embodiments, the card reader may be portable, handheld, or stationary. Various types of card readers and card combinations may be used.

FIG. 19E illustrates an embodiment of the system for managing, directing, and queuing communication events that uses an image sensor located on a communication device 1948 (e.g., a mobile communicating device) to capture a registered personal image 1942 of an individual posted on a social networking website, for example. Individuals can register their own unique image, similar to a Facebook Avatar, in a database. The database of registered individual images and the registration process may be a standalone system or may be hosted on an embodiment of the system for managing, directing, and queuing communication events. The unique image may be placed on various media including electronic, paper, metal, plastic, and fabric for example a tablet computer, a poster, tote bag, brochure, coupon, pen, shirt, or a business card. An embodiment of the system cross-references the captured personal image 1944 with a database of registered personal images. The image may represent a particular individual or may represent a product, division, or company. An embodiment of the system allows a user to submit a request for a callback from the individual with the registered personal image 1942, determines an expected wait time 1946, and places an outgoing call to the communication device 1948 after the expected wait time (or an approximately equivalent time) has passed. Alternatively, an embodiment of the system places an outgoing call to another communication receiving device (not shown) having the phone number provided by the user. One skilled in the art will appreciate that the expected wait time 1946 may be 0 minute and a call is placed immediately, connecting the user to the individual with the registered personal image 1942.

Embodiments of the system and method for managing, directing, and queuing communication events eliminate the need for an individual to give out a phone number. The individual can pass out business cards with the registered personal image 1942. The individual can change the personal image and re-register it to change how people contact him or her, similar to changing the individual's phone number.

An embodiment of the system may be in a callback cloud that bridges the user that requests a callback and the individual from which the callback is requested.

An embodiment of the system provides the database and directory for looking up people's personal images, similar to a phone book. Individuals who register their personal images may have an online account in a hosted system. An individual may log into his or her online account and may change his or her personal image and the preferences of communication, e.g., via phone, email, text message, or instant message. The database may also include companies and other callback participants, their registered logos and symbols, and variations of said logos that include accompanying words or images.

An embodiment of the system may add a special symbol to any QR code, bar code, company logo, or personal unique image that indicates that this QR code, bar code, company logo, or personal unique image triggers a callback for a user and connects the user to a relevant person.

Figure 20B:
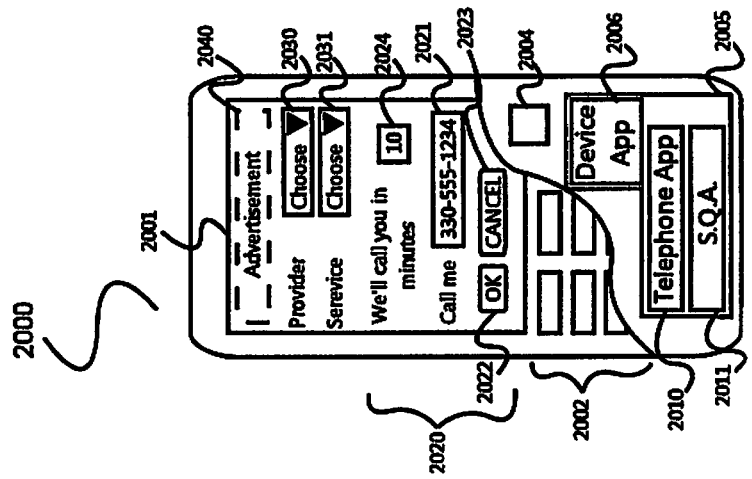
FIG. 20B illustrates an exemplary communication device adapted for use according to an embodiment of the invention.
Figure 20A:
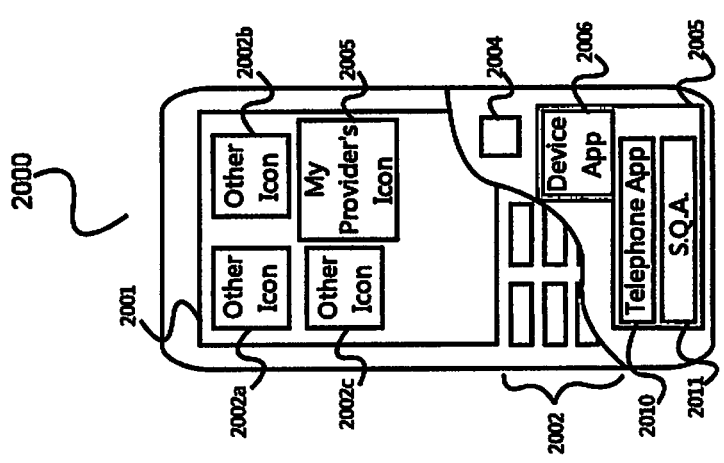
FIG. 20A illustrates an exemplary communication device adapted for use according to an embodiment of the invention.

FIGS. 20A and 20B provide illustrations of an exemplary communication device adapted for use according to an embodiment of the invention. Referring now to FIG. 20A, each device 2000 may include user interface inclusive of display screen 2001 and controls 2002 (such as keys, touch panel, or other controls) for operation of controls rendered on the display screen (keys are represented), memory 2005, and processor 2004 for executing applications encoded in the memory 2005.

The applications encoded in memory 2005 may include a telephone application 2010, and/or appropriate systems adapted to drive operation of the user interface, and the session queuing component 2011.

The telephone application 2010 may be adapted to signal, establish, and maintain an audio communication session (either as the session initiator or receiver) with remote endpoint devices over compatible networks (PSTN, VOIP, and other networks utilized for audio communication sessions). The endpoint devices include the business communication center systems for signaling, establishing, and maintaining audio communication sessions between each service agent and the business clients, each of which may utilize one of the communication devices 2000 for communication with the business.

The session queuing component 2011 may include a launch object 2003 rendered as a "My Providers" icon on the display screen 2001 and adapted to launch operation of the session queuing component 2011 upon detecting user selection of the launch object 2003.

Referring now to FIG. 20B, for purposes of performing the above described functions, visible objects of the session queuing component 2011 (following activation by selection of the launch icon 2003 as depicted in FIG. 20A) include a provider control 2030, a service control 2031, and a confirmation control 2020.

The confirmation control 2020 may include a window 2021 for confirming the identifier of a communication device 2000 (i.e., the call back telephone number utilized to establish an inbound telephone call to the communication device 2000 or other unique "call back" identifier used to establish an audio session with the communication device 2000), an accept control object 2022 and a cancel control object 2023.

In an exemplary embodiment, the telephone number of the communication device 2000 may be pre-populated to the window object 2021 with the window object being active to enable the user to modify the telephone number in the event he or she desires the call back to be at a different telephone station.

The cancel control object 2023 may be a selection button adapted to detect user selection. Upon detecting user selection, cancel control object 2023 may be adapted to terminate operation of the session queuing component.

The accept control object 2022 may be a selection button adapted to launch the confirmation client upon user selection.

Upon launch of the session queuing component 2011 the visible objects of the session queuing component 2011 may be rendered on the display screen 2001 as depicted in FIG. 19B.

The provider control 2030 may be rendered in an active state with the group of providers 1801 populated into its drop down menu. From this menu, the user may select providers from the selected business communication center. The service control 2031 is shown in an active state. The service control 2031 and the confirmation control 2023 may be rendered in an inactive state (i.e., rendered with no populated data, inoperable, and rendered with a gray tint to indicate the inactive state).

Figure 21:
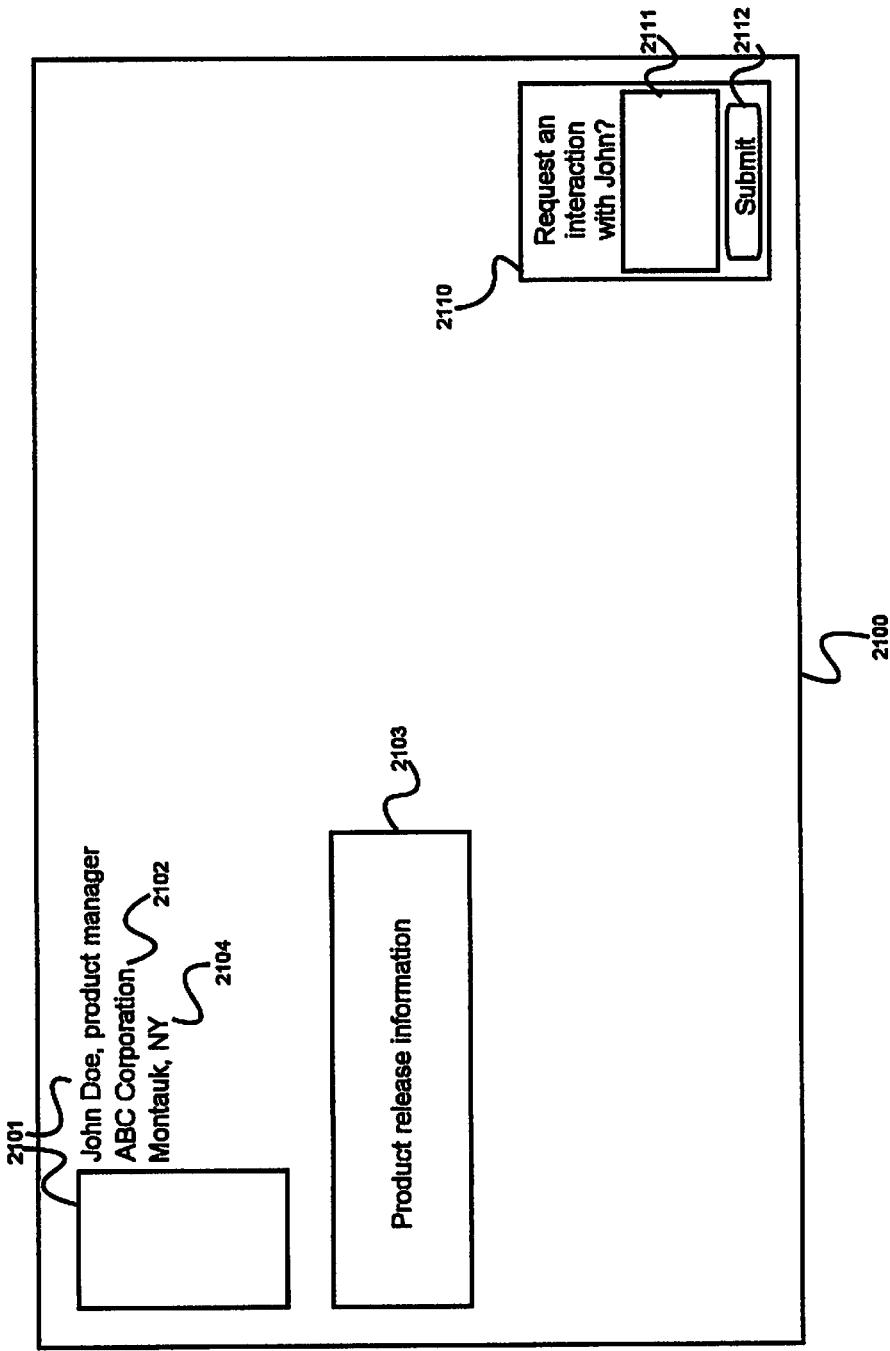
FIG. 21 is an illustration of an exemplary screenshot illustrating the use of a callback cloud widget, according to an embodiment of the invention.

FIG. 21 is an illustration of an exemplary screenshot illustrating the use of a callback cloud widget, according to an embodiment of the invention. Illustrated is an exemplary social networking webpage 2100, such as might be used by such services as Facebook™ or LinkedIn™ by an entity such as an individual or enterprise, or such as might be used by an enterprise to represent products or services in a manner available and convenient for potential consumers to view and interact with. As illustrated, some initial information may be presented on such a page, including but not limited to an individual's name and photograph 2101, enterprise identity 2102, product or service information 2103, or contact information 2104. It will be appreciated by one having ordinary skill in the art, that such information is exemplary and a wide variety of page layouts and contents are possible, and that any configuration may be used according to the invention. Page 2100 may also include an embedded user interface widget 2110, which may alert requester to the possibility of a callback from an individual or enterprise represented by page 2100, and which may contain interactive elements such as one or more fields 2111 where requester may enter additional information about a desired interaction, or a button or popup 2112 allowing requester to submit their request directly from the webpage. As discussed previously in reference to FIG. 14, callback request may be bundled with initial information collected from an electronic environment from which the request originates, such as information presented on page 2100 which may be relevant to the request or any additional information requester may enter via interactive elements, such as why they requested an interaction or what products or services they wish to discuss.

Figure 22:
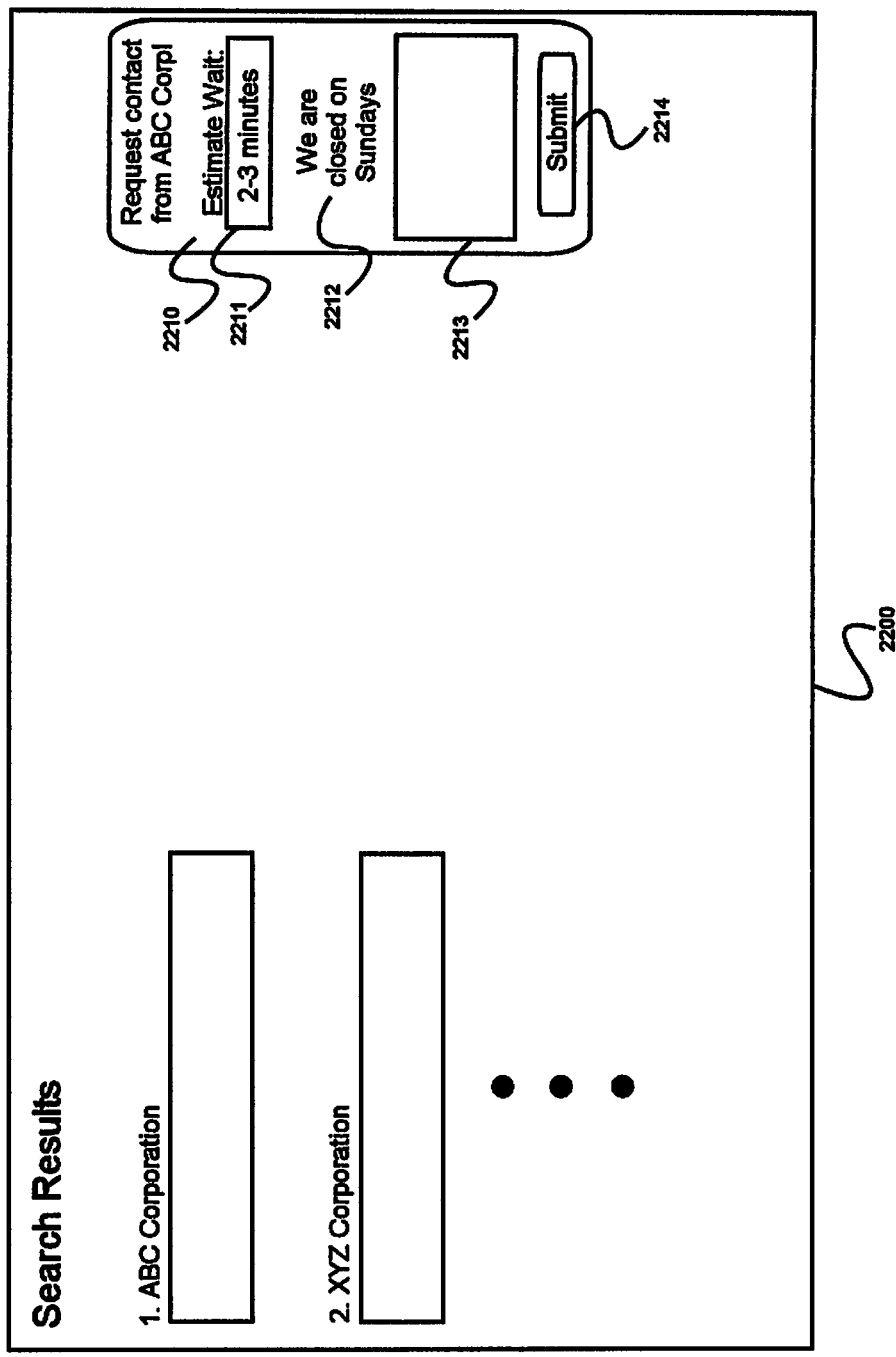
FIG. 22 is an illustration of an exemplary screenshot illustrating the use of embedded ad-based callback cloud functionality, according to an embodiment of the invention.

FIG. 22 is an illustration of an exemplary screenshot illustrating the use of embedded ad-based callback cloud functionality, according to an embodiment of the invention. According to the embodiment, embedded advertisements 2210 may be included on a webpage 2200 for presentation to a requester. Such advertisements may vary in content such as advertisement for products or services, or as may be the case with a webpage containing search engine results, advertisements for products, services, or entities which may be relevant to the requester's search query. It will be appreciated by one having ordinary skill in the art that these are merely exemplary, and a wide variety of advertising content and relevance is possible in the art and may be used according to the invention. Optionally, one or more advertisements may have one or more embedded callback elements, which may optionally display an EWT 2211 or other information 2212 which may be relevant to a requester or callback request, or may have one or more fields 2213 for requester to enter additional information about their request. In this manner, a requester may submit a callback request that is immediately relevant and does not require they know or obtain contact information needed to place a request, allowing a greater convenience than traditional methods.

The skilled person will be aware of a range of possible modifications of the various embodiments described above. Accordingly, the present invention is defined by the claims and their equivalents.

What is claimed is:

1. A system for providing a callback cloud, comprising:
an application server software module operating on a network-attached computer and operated by a callback cloud service provider;
a media server accessible via a network by the application server;
a session management server operating on a network-attached computer and coupled to the media server;
an interaction manager software module operating on a network-attached server;
an intent analysis engine software module operating on a network-attached server; and
a callback cloud database operating on a network-attached computer;
wherein the application server is adapted to receive registrations from participating callback providers unaffiliated with the callback service provider, the registrations providing at least a plurality of channels and endpoints from which callbacks may be placed and a plurality of rules regarding when callbacks may be made;
wherein the application server is adapted to receive a callback request from a first user, the callback request comprising at least an indicia of a specific callback provider from whom a callback is requested, an indicia of when a requested callback should be made, and an indicia of allowable media types for a requested callback;

further wherein, upon receiving a callback request, the application server directs the callback request to the interaction manager, and the interaction manager sends at least a first plurality of data elements pertaining to the callback request to the intent analysis engine and receives from the intent analysis engine a second plurality of data elements pertaining to the callback request, the second plurality of data elements being determined based at least on an analysis of the intent of the callback request; and wherein the interaction manager directs the session management server to initiate a first callback at a specific time and using a specific channel and resource based at least on the second plurality of data elements, and the session management server provides signaling to the media server to conduct the first callback using the specific channel and resource specified by the interaction manager.

2. A method for providing a callback cloud, the method comprising the steps of:
  (a) receiving, at an application server software module operating on a network-attached computer and operated by a callback cloud service provider, a registration from a participating callback provider unaffiliated with the callback service provider, the registration providing at least a plurality of channels and endpoints from which callbacks may be placed and a plurality of rules regarding when callbacks may be made;
  (b) receiving, at the application server software module, a callback request from a first user, the callback request comprising at least an indicia of a specific callback provider from whom a callback is requested, an indicia of when a requested callback should be made, and an indicia of allowable media types for a requested callback;
  (c) directing the callback request to an interaction manager software module operating on a network-attached server;
  (d) sending, using the interaction manager, at least a first plurality of data elements pertaining to the callback request to an intent analysis engine software module operating on a network-attached server;
  (e) receiving, from the intent analysis engine, a second plurality of data elements pertaining to the callback request, the second plurality of data elements being determined based at least on an analysis of the intent of the callback request;
  (f) directing a session management server operating on a network-attached computer and coupled to the media server to initiate a first callback at a specific time and using a specific channel and resource based at least on the second plurality of data elements;
  (g) providing signaling, using the session management server, to a media server accessible via a network, to conduct the first callback using the specific channel and resource specified by the interaction manager; and
  (h) conducting the first callback as specified.

* * * * *